United States Patent
Yuzawa

(10) Patent No.: US 10,560,424 B2
(45) Date of Patent: Feb. 11, 2020

(54) APPARATUS AND METHOD

(71) Applicant: SONY CORPORATION, Tokyo (JP)

(72) Inventor: Keiji Yuzawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 140 days.

(21) Appl. No.: 15/573,896

(22) PCT Filed: Mar. 15, 2016

(86) PCT No.: PCT/JP2016/058164
§ 371 (c)(1),
(2) Date: Nov. 14, 2017

(87) PCT Pub. No.: WO2016/203798
PCT Pub. Date: Dec. 22, 2016

(65) Prior Publication Data
US 2018/0295098 A1    Oct. 11, 2018

(30) Foreign Application Priority Data
Jun. 19, 2015    (JP) .................................. 2015-124125

(51) Int. Cl.
*H04L 29/12*    (2006.01)
*H04L 12/66*    (2006.01)
(Continued)

(52) U.S. Cl.
CPC .......... *H04L 61/2007* (2013.01); *H04B 7/14* (2013.01); *H04L 12/66* (2013.01); *H04L 61/256* (2013.01);
(Continued)

(58) Field of Classification Search
None
See application file for complete search history.

(56) References Cited

U.S. PATENT DOCUMENTS

| 8,218,513 B2* | 7/2012 | Shinozaki ......... H04L 29/12367 370/338 |
| 8,351,420 B2* | 1/2013 | Linkola ............... H04M 7/0084 370/352 |

(Continued)

FOREIGN PATENT DOCUMENTS

JP    2011-135417 A    7/2011

OTHER PUBLICATIONS

Milan Patel, et al., "Mobile-Edge Computing—Introductory Technical White Paper," Issue 1, Internet<URL: https://portal.etsi.org/Portals/0/TBpages/MEC/Docs/Mobile-edge_Computing-_Introductory_Technical_White_Paper_V1%2018-09-14.pdf>, Sep. 2014, 36 pages.

(Continued)

*Primary Examiner* — Bunjob Jaroenchonwanit
(74) *Attorney, Agent, or Firm* — Xsensus LLP

(57) ABSTRACT

[Object] To provide an apparatus and a method capable of appropriately dealing with an IP address in MEC.
[Solution] An apparatus including: a relay processing unit configured to perform relay processing of communication performed between a service provider device that provides a service to a terminal device and is provided in a radio access network and the terminal device; and a conversion processing unit configured to perform processing for converting an internal IP address assigned to the terminal device and an external IP address. In the relay processing, the relay processing unit communicates with the terminal device with use of the internal IP address and communicates with the service provider device with use of the external IP address.

15 Claims, 14 Drawing Sheets

(51) Int. Cl.
*H04W 80/04* (2009.01)
*H04B 7/14* (2006.01)
*H04W 36/00* (2009.01)
*H04W 88/16* (2009.01)
(52) U.S. Cl.
CPC ....... *H04W 36/0016* (2013.01); *H04W 80/04* (2013.01); *H04L 61/6059* (2013.01); *H04W 88/16* (2013.01)

(56) References Cited

U.S. PATENT DOCUMENTS

| | | | | |
|---|---|---|---|---|
| 2006/0187912 A1* | 8/2006 | Schwartz | .......... | H04L 29/12009 370/389 |
| 2010/0085977 A1* | 4/2010 | Khalid | ............... | H04L 12/4641 370/400 |
| 2010/0202410 A1* | 8/2010 | Watanabe | ............ | H04W 36/02 370/331 |
| 2011/0158224 A1* | 6/2011 | Kawauchi | ......... | H04L 29/12367 370/352 |
| 2012/0113966 A1* | 5/2012 | Tao | .......... | H04L 12/12 370/338 |
| 2012/0297037 A1* | 11/2012 | Kumagai | ............ | H04L 12/4641 709/222 |
| 2012/0331520 A1* | 12/2012 | Zhu | ....................... | H04W 8/082 726/3 |
| 2013/0117460 A1* | 5/2013 | Hsu | ........................ | H04L 69/08 709/228 |
| 2013/0117461 A1* | 5/2013 | Hsu | ..................... | H04L 63/0209 709/228 |
| 2013/0170471 A1* | 7/2013 | Nix | ....................... | H04W 36/00 370/331 |
| 2014/0129839 A1* | 5/2014 | So | ....................... | H04L 61/2514 713/171 |
| 2014/0294009 A1* | 10/2014 | Sahara | ............... | H04L 61/2553 370/392 |
| 2015/0023321 A1* | 1/2015 | Liu | .................. | H04W 36/0016 370/331 |
| 2015/0066979 A1* | 3/2015 | Zhang | ................ | H04L 61/1511 707/769 |
| 2015/0327030 A1* | 11/2015 | Bendi | .................... | H04W 4/12 455/466 |
| 2016/0043844 A1* | 2/2016 | Meylan | ................ | H04L 5/0048 370/315 |
| 2016/0100308 A1* | 4/2016 | Bertz | ................. | H04L 65/4076 709/217 |
| 2016/0344686 A1* | 11/2016 | Guo | .................... | H04L 12/6418 |
| 2017/0026774 A1* | 1/2017 | Koshimizu | ............. | H04W 4/70 |
| 2018/0077615 A1* | 3/2018 | El-Najjar | .......... | H04W 36/0083 |
| 2018/0295098 A1* | 10/2018 | Yuzawa | .............. | H04L 12/66 |
| 2018/0352498 A1* | 12/2018 | Reisslein | .............. | H04W 16/24 |

OTHER PUBLICATIONS

International Search Report dated May 31, 2016 in PCT/JP2016/058164 filed Mar. 15, 2016.

\* cited by examiner

APPARATUS AND METHOD

TECHNICAL FIELD

The present disclosure relates to an apparatus and a method.

BACKGROUND ART

In recent years, there has attracted attention a mobile-edge computing (MEC) technology of performing data processing in a server (hereinafter, also referred to as an edge server) provided at a position physically close to a terminal device such as a smartphone. For example, a standard of a technology regarding MEC is studied in Non-Patent Literature 1 cited below.

In MEC, an edge server is disposed at a position physically close to a terminal device, and therefore a communication delay is reduced, as compared to a general cloud server that is concentratedly disposed, and it is possible to use an application required to have high real-time performance. Further, in MEC, the edge server close to the terminal device is caused to perform distributed processing of a function that has been processed on the terminal device side so far, and therefore it is possible to realize high-speed network/application processing, regardless of performance of the terminal device. The edge server may have various functions such as a function serving as an application server and a function serving as a content server and can provide various services to the terminal device.

CITATION LIST

Non-Patent Literature

Non-Patent Literature 1: ETSI, "Mobile-Edge Computing-Introductory Technical White Paper", September, 2014, [searched on May 28, 2015].

DISCLOSURE OF INVENTION

Technical Problem

Content studied in Non-Patent Literature 1 cited above or the like has not been studied long, and it cannot be said that the technology regarding MEC has been satisfactorily proposed. For example, a technology regarding an IP address assigned to a terminal device is one of technologies that have not been satisfactorily proposed.

In view of this, the present disclosure proposes an apparatus and a method, each of which is new, is improved, and is capable of appropriately dealing with an IP address in MEC.

Solution to Problem

According to the present disclosure, there is provided an apparatus including: a relay processing unit configured to perform relay processing of communication performed between a service provider device that provides a service to a terminal device and is provided in a radio access network and the terminal device; and a conversion processing unit configured to perform processing for converting an internal IP address assigned to the terminal device and an external IP address. In the relay processing, the relay processing unit communicates with the terminal device with use of the internal IP address and communicates with the service provider device with use of the external IP address.

Further, according to the present disclosure, there is provided an apparatus including: a processing unit configured to communicate, by using an assigned internal IP address, with a relay device that performs relay processing of communication performed with a service provider device provided in a radio access network. A service provided by the service provider device with use of an external IP address is relayed after the external IP address and the internal IP address are converted in the relay device.

Further, according to the present disclosure, there is provided a method including: performing relay processing of communication performed between a service provider device that provides a service to a terminal device and is provided in a radio access network and the terminal device; performing processing for causing a processor to convert an internal IP address assigned to the terminal device and an external IP address; and in the relay processing, communicating with the terminal device with use of the internal IP address and communicating with the service provider device with use of the external IP address.

Further, according to the present disclosure, there is provided a method including: causing a processor to communicate, by using an assigned internal IP address, with a relay device that performs relay processing of communication performed with a service provider device provided in a radio access network. A service provided by the service provider device with use of an external IP address is relayed after the external IP address and the internal IP address are converted in the relay device.

Advantageous Effects of Invention

As described above, according to the present disclosure, it is possible to appropriately deal with an IP address in MEC. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
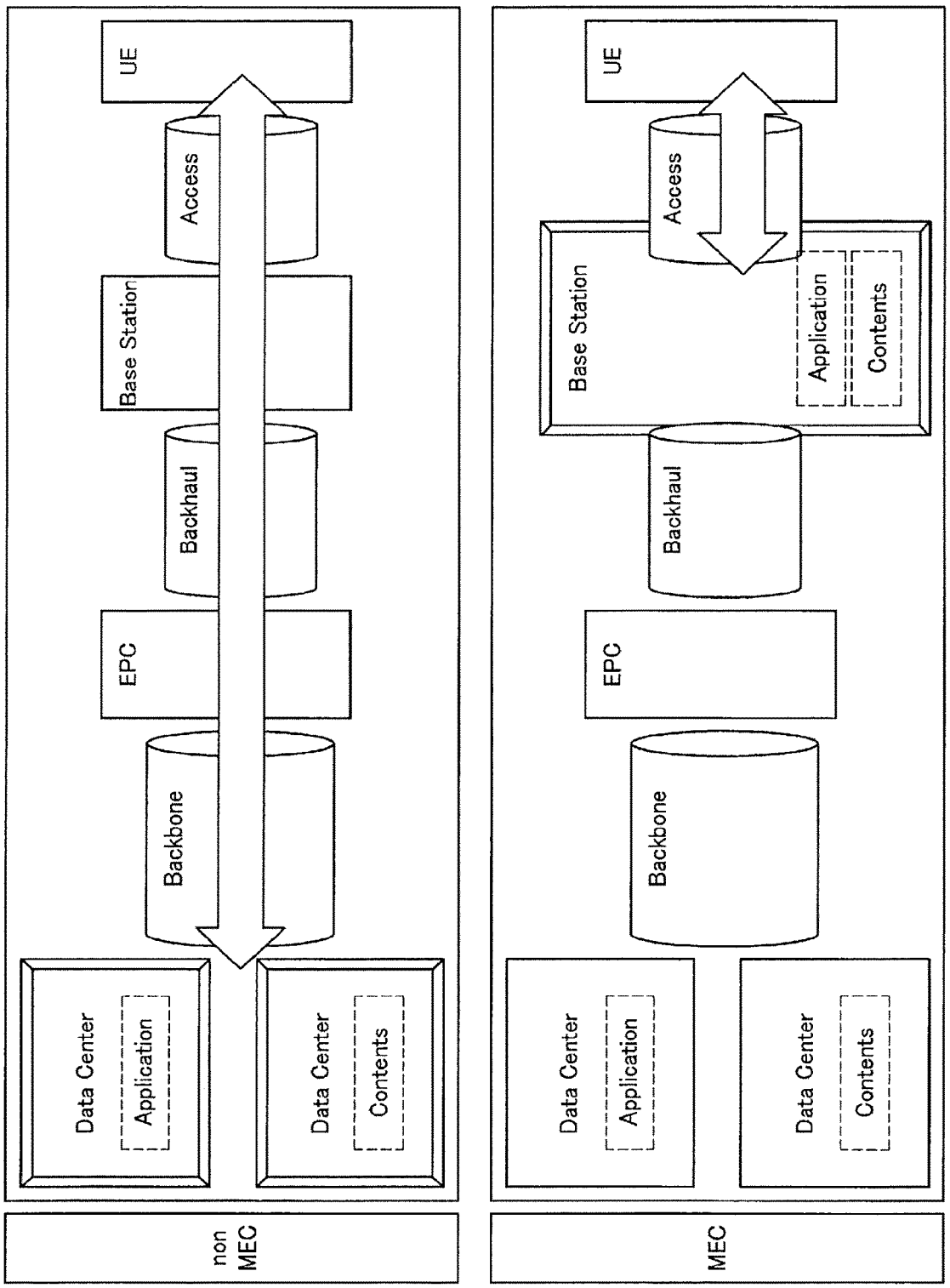
FIG. 1 is an explanatory view for describing an outline of MEC.

Hereinafter, (a) preferred embodiment(s) of the present disclosure will be described in detail with reference to the appended drawings. In this specification and the appended drawings, constituent elements that have substantially the same function and structure are denoted with the same reference numerals, and repeated explanation of these constituent elements is omitted.

Further, in this specification and the drawings, there are cases in which components having substantially the same function are distinguished by adding different alphabets to the end of the same reference numeral. For example, a plurality of components having substantially the same functional configuration are distinguished as necessary like base stations 100A, 100B and 100C. However, in a case where it is unnecessary to distinguish each of the plurality of components having substantially the same functional configuration, only the same reference numeral is added. For example, in a case where it is unnecessary to particularly distinguish base stations 100A, 100B and 100C, they are referred to as simply as a "base station 100."

Note that description will be provided in the following order.
1. Introduction
1.1. MEC
1.2. Technical Problem
2. Configuration Example
2.1. Configuration example of system
2.2. Configuration example of base station
2.3. Configuration example of control device
2.4. Configuration example of terminal device
3. Technical feature
4. Application example
5. Conclusion

1. INTRODUCTION 1.1. MEC (1) Outline
First, an outline of MEC will be described with reference to FIG. 1.

FIG. 1 is an explanatory view for describing an outline of MEC. An upper part of FIG. 1 illustrates a communication path for allowing user equipment (UE) to access an application and contents in current (MEC is not introduced) mobile communication represented by long term evolution (LTE). Further, a lower part thereof illustrates a communication path for allowing the UE to access an application and contents in a case where MEC is introduced.

As illustrated in the upper part of FIG. 1, in the current mobile communication, an application and contents are disposed in IP networks existing on the outside of an evolved packet core (EPC) (a side far from the UE). Thus, in order to execute an application or acquire contents, the UE performs communication via all a relay network (for example, Backbone network), the EPC, a backhaul link, a base station, and an access link which exist on a path to a data center. Therefore, enormous network costs and delay occur.

Meanwhile, as illustrated in the lower part of FIG. 1, in MEC, an application and contents are held on the inside of the EPC (a side close to the UE). For example, in the example illustrated in FIG. 1, a MEC server (i.e., edge server) integrally provided with a base station functions as an application server and a content server. Thus, the UE only needs to perform communication on the inside of the EPC in order to execute an application or acquire contents. Therefore, by introducing MEC, it is possible to not only perform communication with extremely-short delay but also reduce traffic other than the access link (for example, the backhaul link, the EPC, and the relay network). Furthermore, reduction in delay of communication and reduction in traffic other than the access link may also contribute to improvement in throughput and reduction in power consumption on the UE and the network side. As described above, introduction of MEC may have various merits for a user, a network provider, and a service provider. In MEC, data is subjected to distributed processing on a side closer to a local side (i.e., a side close to the UE), and therefore MEC is particularly expected to be applied to an application rooted in an area.

Note that FIG. 1 illustrates an example in which the MEC server is integrally provided with the base station. However, the present technology is not limited to such an example. The MEC server may be provided as a device different from the base station or may be physically separated from the base station. In the present embodiment, description will be provided by assuming that the MEC server is integrally provided with the base station as an example. Hereinafter, a MEC server integrally provided with a base station will also be referred to as a MEC server corresponding to a base station, and, similarly, a base station integrally provided with a MEC server will also be referred to as a base station corresponding to a MEC server.

(2) Platform
Next, a platform of a MEC server will be described with reference to FIG. 2.

Figure 2:
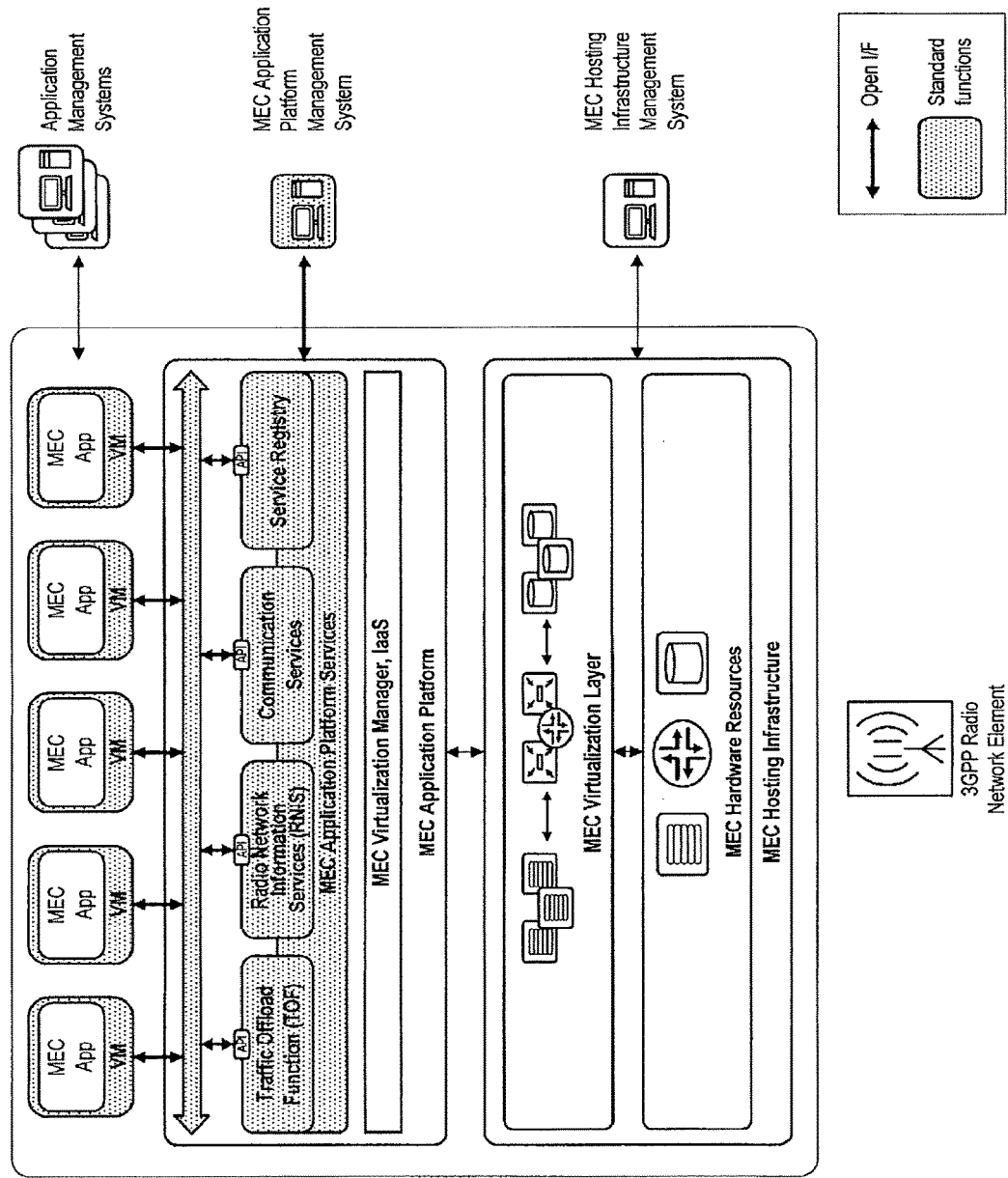
FIG. 2 is an explanatory view for describing a platform of a MEC server.

FIG. 2 is an explanatory view for describing the platform of the MEC server. A 3GPP radio network element that is the lowest constituent element is base station equipment such as an antenna and an amplifier. A hosting infrastructure thereon is made up of hardware resources, such as server equipment and a virtualization layer formed by software that virtualizes those hardware resources, and can provide a general virtual server technology. An application platform operates on this virtual server.

A virtualization manager performs management such as generation and deletion of a virtual machine (VM) serving as an environment in which each highest application (MEC App) operates. Each application may be executed by different companies, and therefore the virtualization manager is required to consider security, division of a resource to be assigned, and the like, but it is possible to apply a general cloud infrastructure technology.

An application platform service is an aggregate of common services that are characteristic of MEC. A traffic offload function performs switching control such as routing between a case where a request from the UE is processed by an application on the MEC server and a case where the request is processed by an application on the Internet (master application on a data server). In a case where each application on the MEC server needs wireless status information such as intensity of a radio wave between a base station corresponding to the MEC server and the UE, radio network information services acquire information from a lower wireless network and provide the information to the application. Communication services provide a path for allowing each application on the MEC server to communicate with the UE or an application on the Internet. In a case where a request for generation or operation of each application on the MEC server is received, a service registry authenticates whether or not the application is legitimate, registers the application, and responds to an inquiry from other entities.

Each application in each VM operates on the application platform described above and provides various kinds of services to the UE, instead of the application on the Internet or in corporation with the application.

MEC servers are expected to be installed in a large number of base stations, and therefore study of a structure for managing and linking a large number of MEC servers is also required. A hosting infrastructure management system, an application platform management system, and an application management system manage corresponding entities on the MEC server and link the entities.

(3) Tendency of Standardization

In Europe, industry specification groups (ISG) were established in the ETSI and standardization work of MEC was started in October, 2014. The standardization work is currently worked with a view to preparing a first specification by the end of 2016. More specifically, standardization of API to realize MEC has been mainly worked under cooperation of ETSI ISG network function virtualization (NFV) and the 3GPP.

1.2. Technical Problem

Next, a technical problem will be described with reference to FIGS. 3 and 4.

Figure 3:
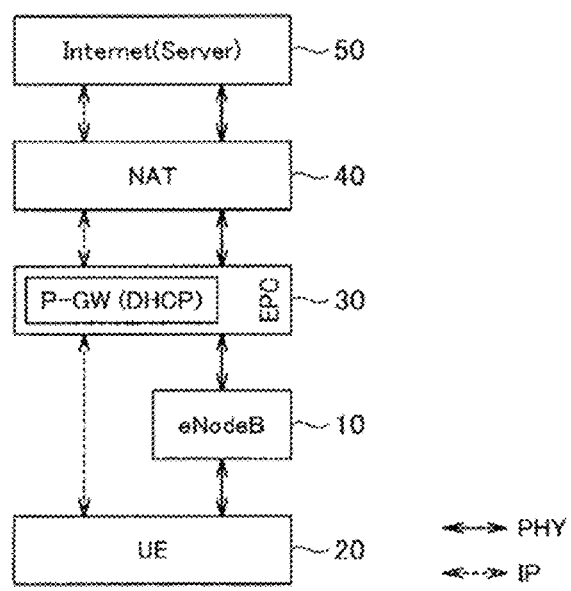
FIG. 3 is an explanatory view for describing a technical problem.

FIG. 3 is an explanatory view for describing a technical problem. Specifically, FIG. 3 illustrates an example of current communication, that is, communication performed in a case where MEC is not introduced between a server 50 on the Internet and a terminal device (UE) 20. A solid-line arrow in FIG. 3 shows a physical connection, and a dashed-line arrow therein shows a logical connection, more specifically, an IP connection.

The server 50 is a device that provides a service to the terminal device 20.

A network address translation (NAT) device 40 is a device for converting an IP address included in a packet into another IP address. The NAT device 40 may convert not only the IP address but also a port number.

An evolved packet core (EPC) 30 is a so-called core network. The EPC 30 includes, for example, a PDN gateway (P-GW) functioning as a dynamic host configuration protocol (DHCP).

A base station (eNodeB) 10 is a wireless communication device that provides a wireless communication service to the terminal device 20.

The terminal device (UE) 20 is a wireless communication device connected to the base station 10 to perform wireless communication.

The terminal device 20 receives assignment of an IP address in order to perform IP communication with the server 50. For example, the IP address is assigned by the P-GW.

Herein, in the present circumstances, IPv4 is used in equipment on the Internet side from the NAT device 40 in many cases. Therefore, communication using an IPv4 global address is performed on the Internet side (for example, the server 50). Meanwhile, communication using an IPv4 private IP address or IPv6 IP address is performed on the terminal device 20 side from the NAT device 40 as a countermeasure against exhaustion of IPv4 IP addresses. Further, communication using those IP addresses of different formats is relayed after the IP addresses are converted in the NAT device 40.

Figure 4:
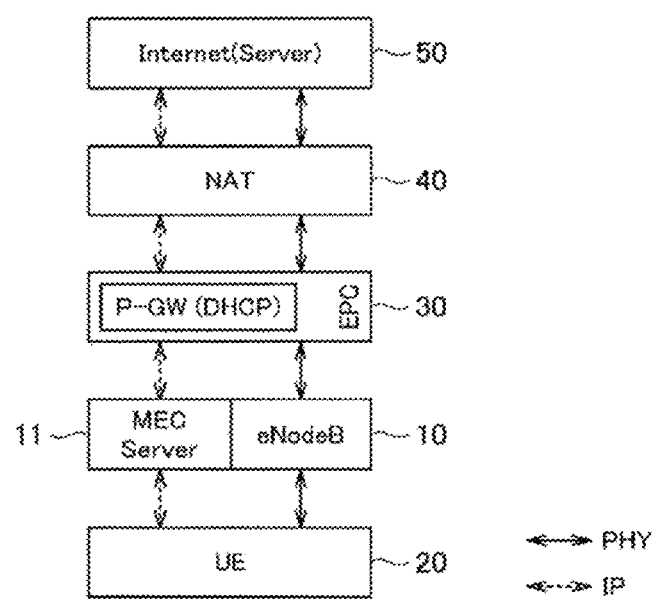
FIG. 4 is an explanatory view for describing a technical problem.

FIG. 4 is an explanatory view for describing the technical problem. Specifically, FIG. 4 illustrates an example of communication performed between the server 50 on the Internet and the terminal device 20 in a case where MEC is introduced into the network illustrated in FIG. 3. A solid-line arrow shown in FIG. 4 shows a physical connection and a dashed-line arrow therein shows a logical connection, more specifically, an IP connection.

As illustrated in FIG. 4, a MEC server 11 is introduced. The MEC server 11 is a service provider device that provides a service to the terminal device 20 in cooperation with the server 50 on the Internet or another MEC server 11 or alone. The MEC server 11 is provided to correspond to the base station 10. The MEC server 11 may be integrally provided with the base station 10 or may be separately provided.

Communication using an IPv4 private IP address or IPv6 IP address is performed in the MEC server 11 provided on the terminal device 20 side. Therefore, an IP address used in the MEC server 11 is different from an IP address used the server 50 on the Internet. Therefore, in a case where, for example, a service is taken over between the MEC server 11 and the server 50 on the Internet, continuity of the service may be interrupted due to the difference in IP address.

A system according to an embodiment of the present disclosure has been made in view of the above circumstance. In the system according to the present embodiment, the same IP address used in a server on the Internet is also used in the MEC server. Hereinafter, the system according to the present embodiment will be described in detail.

2. CONFIGURATION EXAMPLE

2.1. Configuration Example of System

Figure 5:
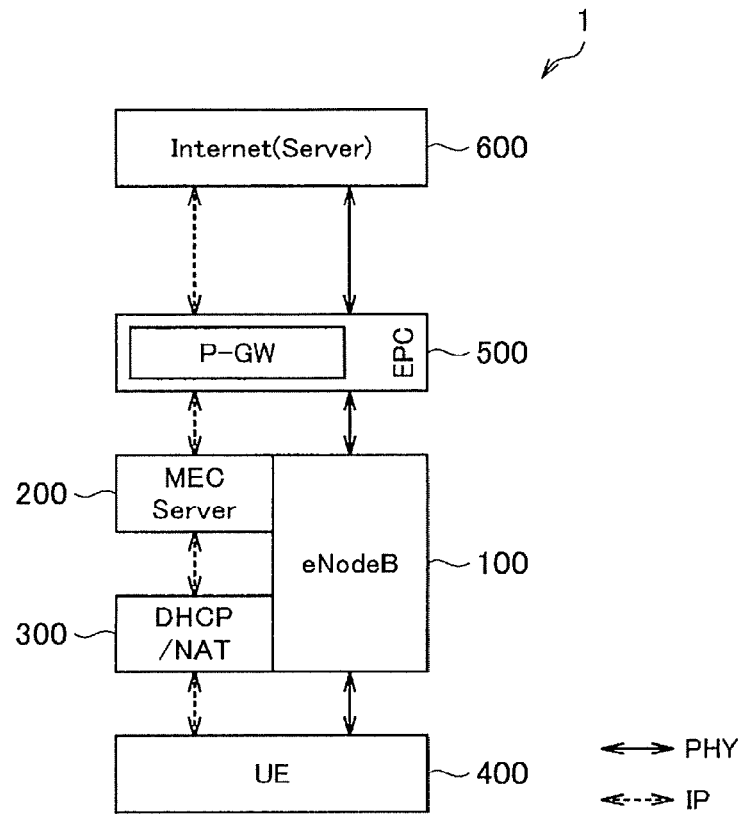
FIG. 5 is an explanatory view illustrating an example of a configuration of a system according to an embodiment of the present disclosure.

Next, an example of a configuration of a system 1 according to the present embodiment will be described with reference to FIG. 5. FIG. 5 is an explanatory view illustrating an example of the configuration of the system 1 according to the present embodiment. As illustrated in FIG. 5, the system 1 according to the present embodiment includes a server 600 on the Internet, an EPC 500, a base station (eNodeB) 100, a MEC server 200, a control device (DHCP/NAT) 300, and a terminal device (UE) 400.

The server 600 is a device that provides a service to the terminal device 400.

The EPC 500 is a so-called core network. The EPC 500 includes, for example, a P-GW.

The base station (eNodeB) 100 is a wireless communication device that provides a wireless communication service to the terminal device 400. "eNodeB" may be eNodeB defined in LTE or LTE-A or may more generally mean a communication device that provides a wireless communication service. The base station 100 may be realized as, for example, a small cell base station for operating a small cell, a master device, a relay node, or a moving cell. In addition, the base station 100 may be realized as, for example, an access point of Wi-Fi (registered trademark). In FIG. 5 and the drawings subsequent to FIG. 5, the base station 100 will also be written as an eNodeB 100.

The MEC server 200 is a service provider device that provides a service to the terminal device 400 in cooperation with the server 600 on the Internet or another MEC server 200 or alone. The MEC server 200 is different from the server 600 in that the MEC server 200 is an edge server provided in a radio access network. For example, the MEC server 200 is provided to correspond to the base station 100. The MEC server 200 may be realized as a logical function entity or may be integrally provided with the corresponding base station 100. As a matter of course, the MEC server 200 may be provided separately from the corresponding base station 100 as an independent device.

The control device (DHCP/NAT) 300 is a control device functioning as a DHCP and/or NAT. The control device 300 may be realized as a logical function entity or may be integrally provided with the corresponding base station 100. As a matter of course, the control device 300 may be provided as an independent device and be provided to communicate with the corresponding base station 100. In FIG. 5 and the drawings subsequent to FIG. 5, the control device 300 will also be written as a DHCP/NAT 300.

The terminal device (UE) 400 is a wireless communication device connected to the base station 100 to perform wireless communication. The UE may be UE defined in LTE or LTE-A and may more generally mean a communication device. Herein, the terminal device 400 is also referred to as a user. In FIG. 5 and the drawings subsequent to FIG. 5, the terminal device 400 will also be written as UE 400.

As illustrated in FIG. 5, in the present embodiment, the control device 300 having a NAT function is provided between the MEC server 200 and the terminal device 400. Therefore, it is possible to use an IPv4 IP address in common in equipment on the Internet side from the control device 300. That is, the server 600 on the Internet and the MEC server 200 can use the same IP address regarding identification of the terminal device 400. Therefore, for example, it is possible to restrain interruption of continuity of a service occurring in a case where the service is taken over between the MEC server 200 and the server 600 on the Internet.

Note that FIG. 5 illustrates an example in which the control device 300 is integrally provided with the base station 100. However, the present technology is not limited to such an example. The control device 300 may be provided as a device different from the base station 100 or may be provided separately from the base station 100. In the present embodiment, description will be provided by assuming that the control device 300 is integrally provided with a base station as an example. Hereinafter, the control device 300 integrally provided with the base station 100 will also be referred to as the control device 300 corresponding to the base station 100, and, similarly, the base station 100 integrally provided with the control device 300 will also be referred to as the base station 100 corresponding to the control device 300.

2.2. Configuration Example of Base Station

Figure 6:
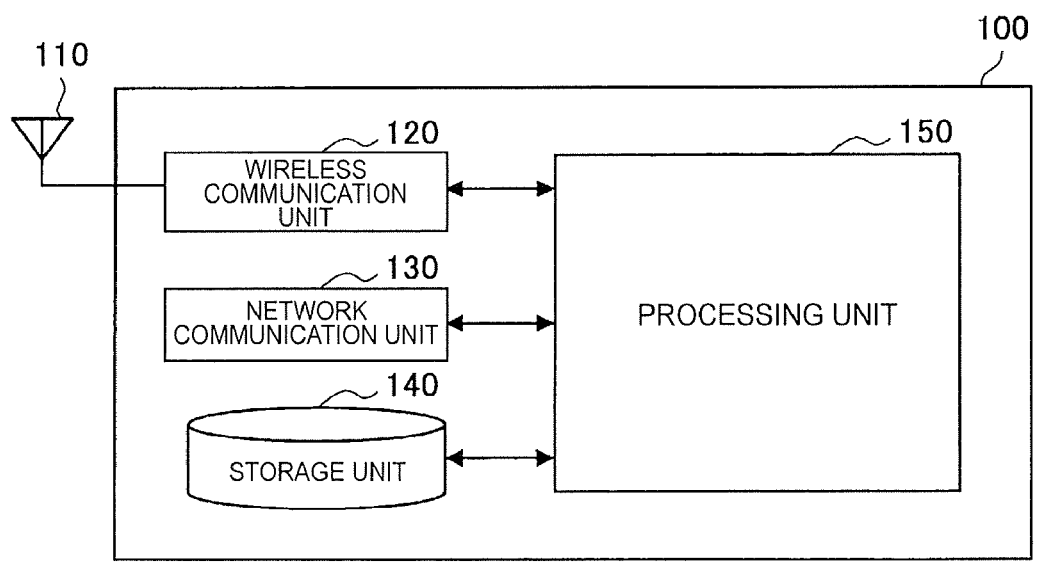
FIG. 6 is a block diagram illustrating an example of a configuration of a base station according to this embodiment.

Next, an example of a configuration of the base station 100 according to the present embodiment will be described with reference to FIG. 6. FIG. 6 is a block diagram illustrating an example of the configuration of the base station 100 according to the present embodiment. When referring to FIG. 6, the base station 100 includes an antenna unit 110, a wireless communication unit 120, a network communication unit 130, a storage unit 140, and a processing unit 150.

(1) Antenna Unit 110

The antenna unit 110 emits a signal output by the wireless communication unit 120 to a space as a radio wave. In addition, the antenna unit 110 converts a radio wave in a space into a signal and outputs the signal to the wireless communication unit 120.

(2) Wireless Communication Unit 120

The wireless communication unit 120 transmits and receives signals. For example, the wireless communication unit 120 transmits a downlink signal to a terminal device and receives an uplink signal from a terminal device.

(3) Network Communication Unit 130

The network communication unit 130 transmits and receives information. For example, the network communication unit 130 transmits information to another node and receives information from another node.

(4) Storage Unit 140

The storage unit 140 temporarily or permanently stores programs and various data that are necessary for operations of the base station 100.

(5) Processing Unit 150

The processing unit 150 provides various functions of the base station 100. For example, the processing unit 150 performs processing for relaying communication between a core network and the terminal device 400.

2.3. Configuration Example of Control Device

Figure 7:
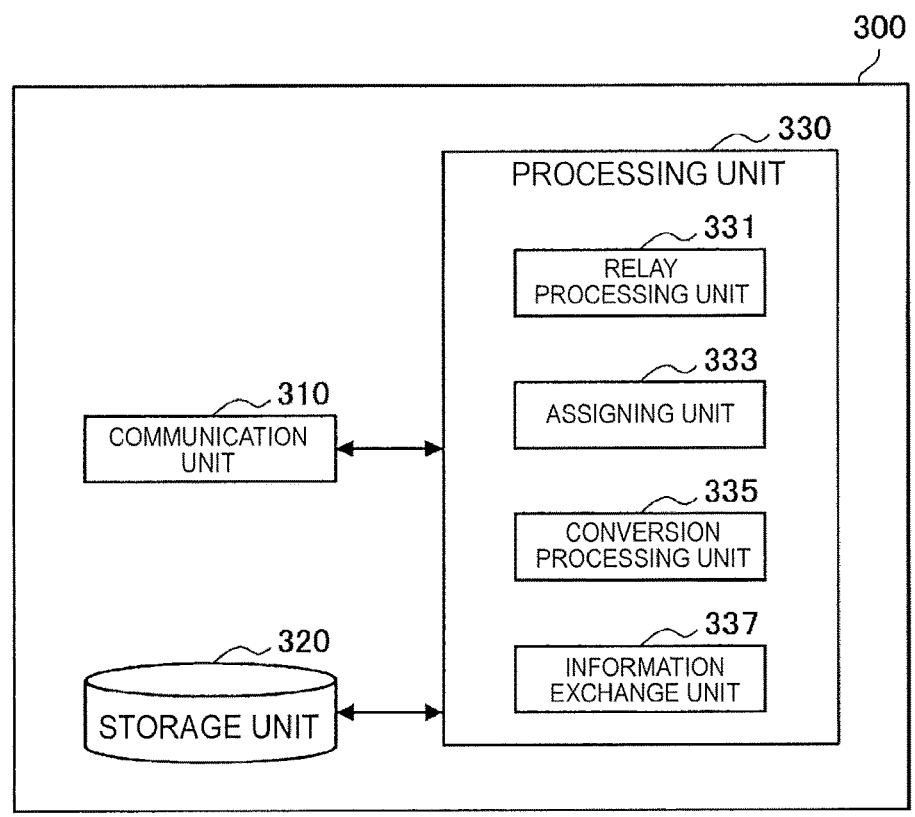
FIG. 7 is a block diagram illustrating an example of a configuration of a control device according to this embodiment.

Next, an example of a configuration of the control device 300 according to the present embodiment will be described with reference to FIG. 7. FIG. 7 is a block diagram illustrating an example of the configuration of the control device 300 according to the present embodiment. When referring to FIG. 7, the control device 300 includes a communication unit 310, a storage unit 320, and a processing unit 330.

(1) Communication Unit 310

The communication unit 310 transmits and receives signals. For example, the communication unit 310 performs communication with the corresponding base station 100. In a case where the control device 300 is provided as a logical entity and is included in the base station 100, the communication unit 310 performs communication with, for example, the processing unit 150.

(2) Storage Unit 320

The storage unit 320 temporarily or permanently stores programs and various kinds of data for operation of the control device 300.

(3) Processing Unit 330

The processing unit 330 provides various functions of the control device 300. The processing unit 330 includes a relay processing unit 331, an assigning unit 333, a conversion processing unit 335, and an information exchange unit 337. Note that the processing unit 330 may further include other constituent elements in addition to those constituent elements. That is, the processing unit 330 may also perform not only operation of those constituent elements but also operation of other constituent elements.

Operation of the relay processing unit 331, the assigning unit 333, the conversion processing unit 335, and the information exchange unit 337 will be described in detail below.

2.4. Configuration Example of Terminal Device

Figure 8:
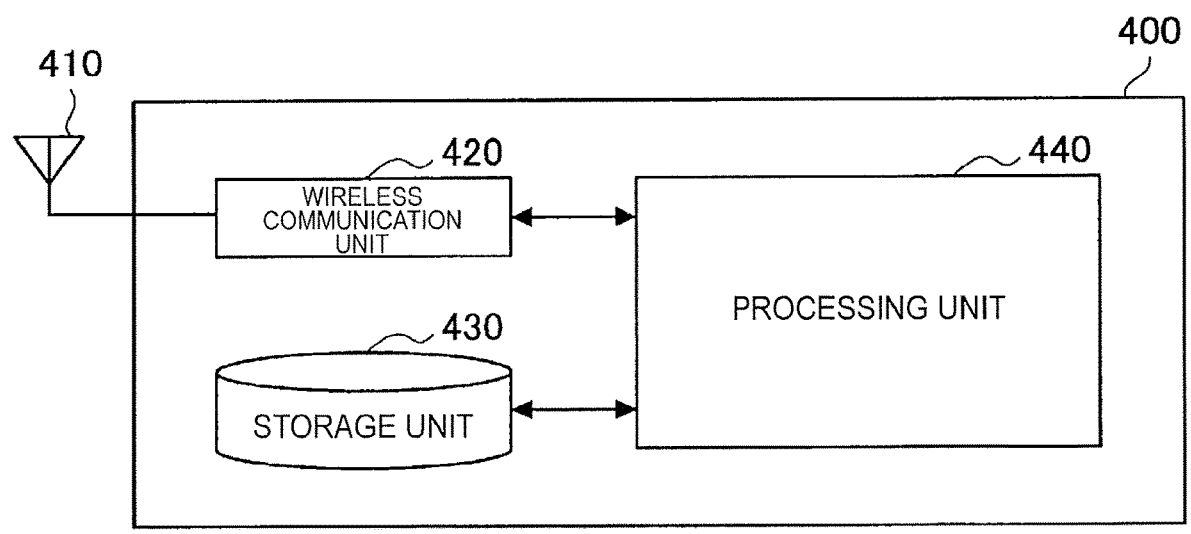
FIG. 8 is a block diagram illustrating an example of a configuration of a terminal device according to this embodiment.

Next, an example of a configuration of the terminal device 400 according to the present embodiment will be described with reference to FIG. 8. FIG. 8 is a block diagram illustrating an example of the configuration of the terminal device 400 according to the present embodiment. When referring to FIG. 8, the terminal device 400 includes an antenna unit 410, a wireless communication unit 420, a storage unit 430, and a processing unit 440.

(1) Antenna Unit 410

The antenna unit 410 emits a signal output by the wireless communication unit 420 to a space as a radio wave. In addition, the antenna unit 410 converts a radio wave in a space into a signal and outputs the signal to the wireless communication unit 420.

(2) Wireless Communication Unit 420

The wireless communication unit 420 receives a signal. For example, the wireless communication unit 420 receives a downlink signal from a base station and transmits an uplink signal to a base station.

(3) Storage Unit 430

The storage unit 430 temporarily or permanently stores programs and various kinds of data for operation of the terminal device 400.

(4) Processing Unit 440

The processing unit 440 provides various functions of the terminal device 400. For example, the processing unit 440 controls processing for causing the terminal device 400 to communicate with the base station 100. Operation of the processing unit 440 will be described in detail below.

3. TECHNICAL FEATURE

Next, a technical feature according to the present embodiment will be described.

(1) DHCP Function

The control device 300 (for example, the assigning unit 333) assigns an IP address to the terminal device 400.

For example, the control device 300 generates an IPv6 IP address and assigns the IPv6 IP address as assignment of an internal IP address. Further, the control device 300 may use, for example, DHCPv6 prescribed in IETF RFC 3315. The internal IP address may also be referred to as, for example, a local IP address or private IP address.

Normally, the first 8 bytes of an IPv6 address are fixed values referred to as a prefix indicating a network to which the terminal device belongs, and the last 8 bytes are an interface ID for identifying a node. Therefore, in a case where the IPv6 address is used, it is possible to perform an immense number of assignments, i.e., the 64th power of 2. There is a method of extending a MAC address of 48 bit to 64 bit, which is referred to as EUI-64, to generate the interface ID. However, the terminal device 400 does not necessarily have a MAC address, and therefore generation using an international mobile subscriber identity (IMSI) may be employed as alternative means. The IMSI is an identification number of a subscriber identity module (SIM) and is a 15 digit number in decimal. The control device 300 adds "0" to the head of the IMSI to form 16 digits in decimal and then assigns the 16 digits to 8 bytes of the interface ID in a binary coded decimal (BCD) format. The IMSI is managed to be internationally unique, and therefore the generated interface ID can also be used as an internationally unique ID. Therefore, even in a case where the terminal device 400 is moved and is handed over to another base station 100, the interface ID does not collide with an interface ID in a network serving as a handover destination.

Instead of the IMSI, for example, an international mobile equipment identity (IMEI), a mobile subscriber integrated services digital network number (MSISDN), or the like may be used. The IMEI is a 15-digit UE identification number in decimal, and the MSISDN is a 15-digit telephone number in decimal. In any method, the control device 300 can avoid collision at the time of handover by using an assigning method unified in a network of an assignment target (a range having the same prefix).

Further, the control device 300 assigns, for example, an IPv4 global IP address and a port number as assignment of an external IP address.

(2) NAT Function

The control device 300 (for example, the conversion processing unit 335) performs processing for converting an internal IP address and an external IP address.

More specifically, the control device 300 (for example, the relay processing unit 331) is a relay device that performs relay processing of communication performed between a service provider device (for example, the MEC server 200 or the server 600 on the Internet) and the terminal device 400 by communicating with the terminal device 400 with the use of an internal IP address and communicating with the service provider device with the use of an external IP address. With this, it is possible to use an IPv4 IP address in common in equipment on the Internet side from the control device 300. That is, the server 600 on the Internet and the MEC server 200 can use the same IP address regarding identification of the terminal device 400. Therefore, for example, it is possible to restrain interruption of continuity of a service occurring in a case where the service is taken over between the MEC server 200 and the server 600 on the Internet.

The control device 300 may use, for example, NAT64 prescribed in IETF RFC 6146.

The control device 300 (storage unit 320) stores information indicating correspondence between an internal IP address and an external IP address. For example, the control device 300 stores information indicating correspondence regarding the terminal device 400 connected to the corresponding base station 100. Hereinafter, the information indicating this correspondence will also be referred to as correspondence information. The correspondence information includes an internal IP address and an external IP address corresponding to the internal IP address.

Figure 9:
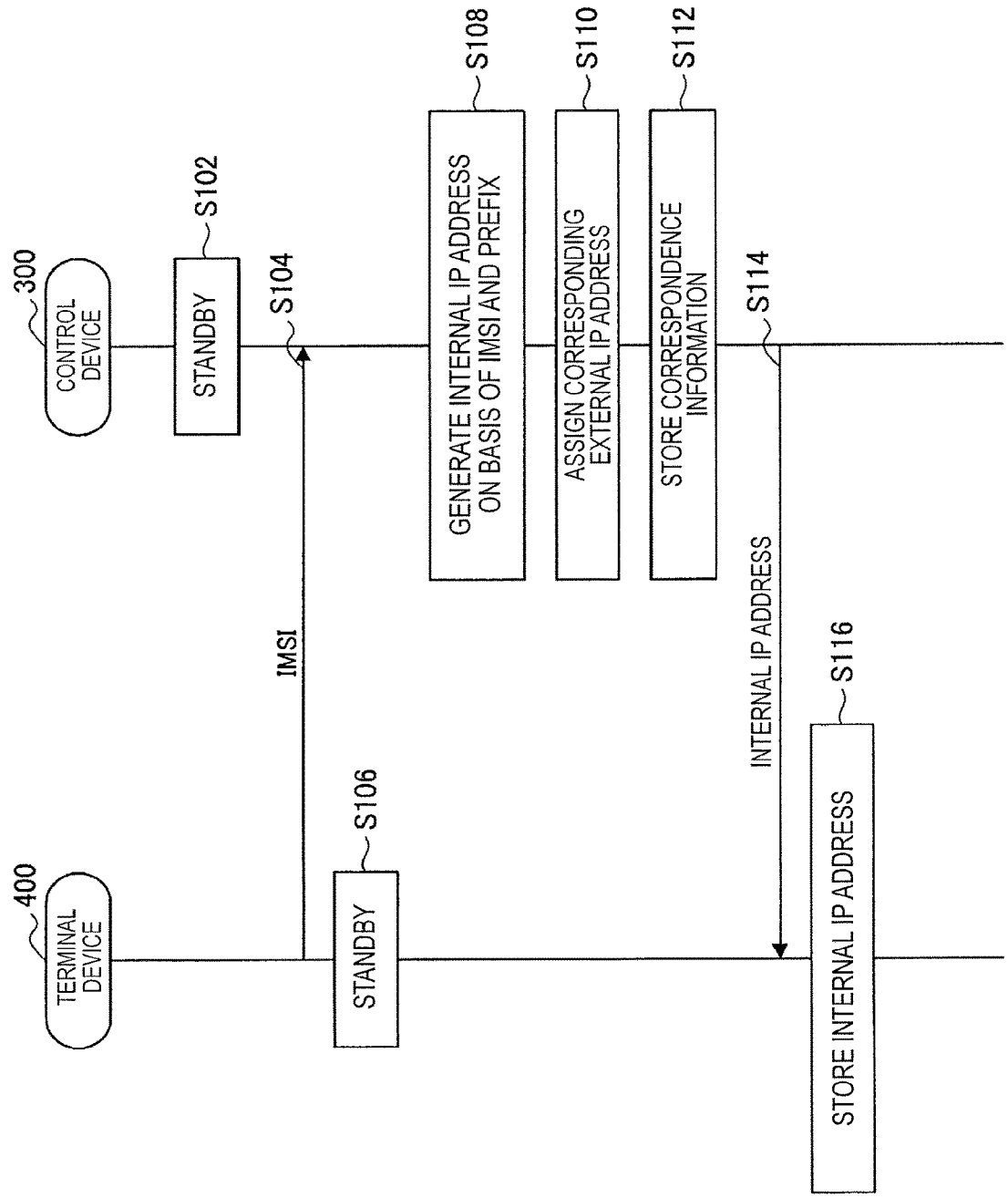
FIG. 9 is a sequence diagram illustrating an example of a flow of correspondence information generation processing executed in the system according to this embodiment.

Herein, an example of a flow of processing of the system 1 performed in a case where the control device 300 generates correspondence information will be described with reference to FIG. 9. FIG. 9 is a sequence diagram illustrating an example of a flow of correspondence information generation processing executed in the system 1 according to the present embodiment. As illustrated in FIG. 9, the terminal device 400 and the control device 300 are involved in this sequence.

First, the terminal device 400 transmits, to the control device 300 that is currently standing by (Step S102), an IMSI stored on a SIM card or the like of the terminal device 400 (Step S104). Thereafter, the terminal device 400 waits a response from the control device 300 (Step S106).

Then, the control device 300 generates an interface ID on the basis of the received IMSI and generates an internal IP address (IPv6) on the basis of a prefix of a network of the corresponding base station 100 (Step S108). Further, the control device 300 assigns an external IP address (IPv4 global address and port number) corresponding to the generated internal IP address (Step S110). Then, the control device 300 stores correspondence information indicating correspondence between the internal IP address and the external IP address (Step S112).

Then, the control device 300 transmits the generated internal IP address to the terminal device 400 (Step S114). The terminal device 400 stores the received internal IP address (Step S116).

Thus, the processing is terminated.

Figure 10:
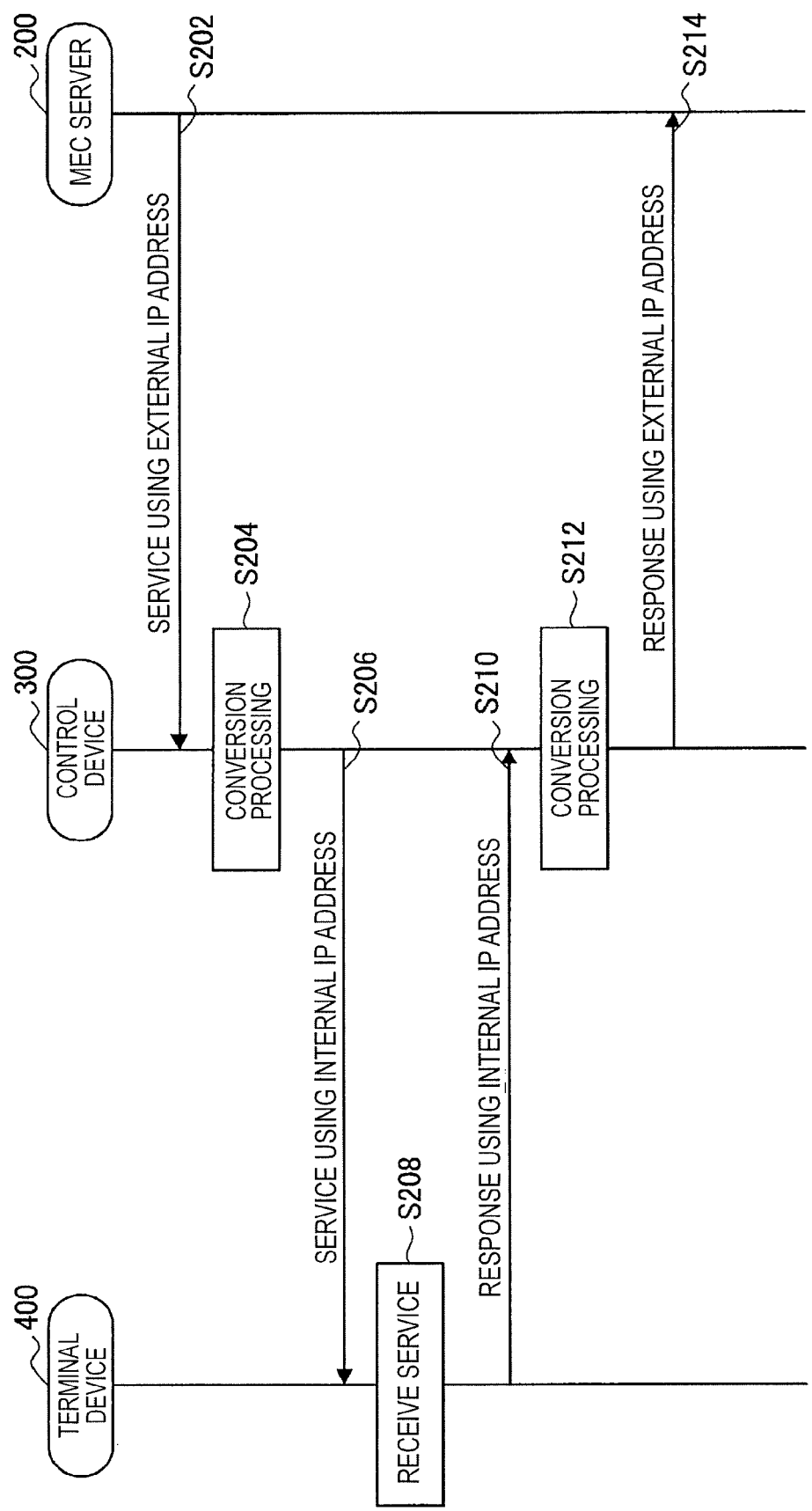
FIG. 10 is a sequence diagram illustrating an example of a flow of communication processing executed in the system according to this embodiment.

Next, NAT processing performed by the control device 300 regarding communication in the system 1 will be described with reference to FIG. 10. FIG. 10 is a sequence diagram illustrating an example of a flow of communication processing executed in the system 1 according to the present embodiment. As illustrated in FIG. 10, the terminal device 400, the control device 300, and the MEC server 200 are involved in this sequence.

As illustrated in FIG. 10, first, the MEC server 200 transmits information for a service for the terminal device 400 to the control device 300 with the use of an external IP address of the terminal device 400 (Step S202). Then, the control device 300 performs conversion processing for converting the external IP address into an internal IP address (Step S204). Then, the control device 300 transmits the information for the service for the terminal device 400 to the terminal device 400 with the use of the internal IP address of the terminal device 400 (Step S206). With this, the terminal device 400 receives the service provided from the MEC server 200 (Step S208).

Then, the terminal device 400 transmits, to the control device 300, a response to the MEC server 200 with the use of the internal IP address of the terminal device 400 (Step S210). For example, the internal IP address may be used as identification information of a transmission source of the response. Next, the control device 300 performs conversion processing for converting the internal IP address into the external IP address (Step S212). Then, the control device 300 transmits, to the MEC server 200, the response to the MEC server 200 with the use of the external IP address of the terminal device 400 (Step S214). For example, the external IP address may be used as identification information of a transmission source of the response.

Thus, the processing is terminated.

(3) Information Exchange

The control device 300 (for example, the information exchange unit 337) may exchange correspondence information with another information processing apparatus. For example, the control device 300 may exchange correspondence information with an information processing apparatus relating to handover of the terminal device 400.

For example, in a case where the terminal device 400 is handed over from the corresponding base station 100 to another base station, the control device 300 (for example, the information exchange unit 337) notifies a handover destination of correspondence information. With this, the correspondence information is taken over by the handover destination, and conversion/relay processing is appropriately performed.

Further, in a case where the terminal device 400 is handed over from another base station to the corresponding base station 100, the control device 300 (for example, the information exchange unit 337) acquires correspondence information from a handover source. With this, the control device 300 can take over the correspondence information from the handover source and perform conversion/relay processing similar to processing performed in the handover source.

(3-1) First Example

A first example is an example in which correspondence information is exchanged between the control devices 300. For example, in a case where handover is performed between the base stations 100 in which the control devices 300 are provided, exchange of correspondence information according to the present example is performed.

For example, regarding notification to a handover destination, another control device 300 corresponding to the base station 100 serving as the handover destination is notified of correspondence information. Further, regarding acquisition from a handover source, correspondence information is acquired from another control device 300 corresponding to the base station 100 serving as the handover source.

As described above, the control device 300 may be provided in the base station 100. In that case, the control device 300 (the information exchange unit 337) may exchange correspondence information with (another control device 300 provided in) another base station 100 other than the base station 100 in which the control device 300 is provided. At that time, for example, an LTE-X2 interface may be used. In addition, the control device 300 (the information exchange unit 337) may exchange correspondence information with (another control device 300 provided in) another base station 100 other than the base station 100 in which the control device 300 is provided via the terminal device 400. At that time, for example, an LTE-Uu interface may be used. Those points will be described in more detail with reference to FIGS. 11 and 12.

Figure 11:
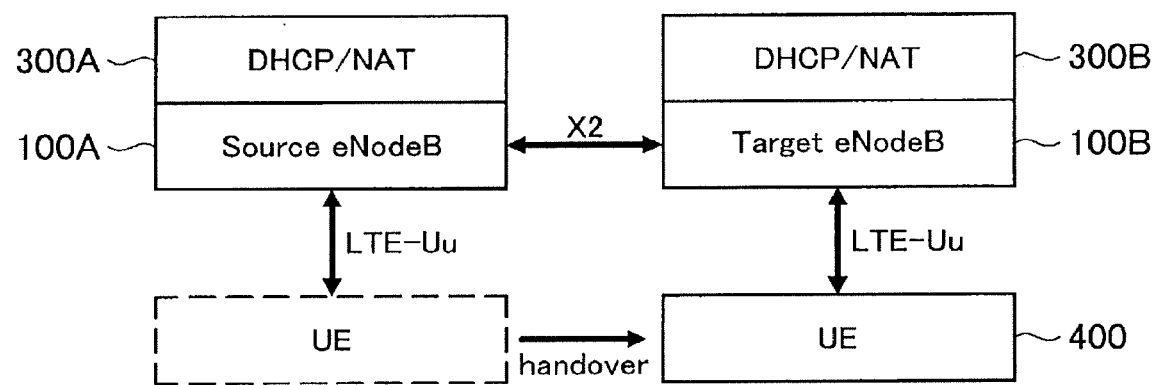
FIG. 11 is an explanatory view for describing exchange processing of correspondence information executed in the system according to this embodiment.

FIG. 11 is an explanatory view for describing exchange processing of correspondence information executed in the system 1 according to the present embodiment. A base station (eNodeB) 100A is a serving base station of the terminal device (UE) 400 and is a source base station serving as a handover source. A base station (eNodeB) 100B is a target base station serving as a handover destination. A control device 300A is provided in the base station 100A, and a control device 300B is provided in the base station 100B. In such a condition, the terminal device 400 is handed over from the base station 100A to the base station 100B.

As illustrated in FIG. 11, the terminal device 400 and the base station 100 can communicate with each other by using an LTE-Uu interface. Further, the base stations 100 can communicate with each other by using an LTE-X2 interface. At the time of handover, information on the terminal device 400 is transferred from the base station 100A serving as the handover source to the base station 100B serving as the handover destination. An X2AP SN Status Transfer message using the LTE-X2 interface may be used in this transfer. The base station 100A notifies the base station 100B of correspondence information together with this transfer or separately therefrom. In addition, the terminal device 400 may acquire correspondence information from the base station 100 serving as the handover source by using the LTE-Uu interface and notify the base station 100 serving as the handover destination of the correspondence information by using the LTE-Uu interface.

Next, an example of a flow of the processing in the example illustrated in FIG. 11 will be described with reference to FIG. 12.

Figure 12:
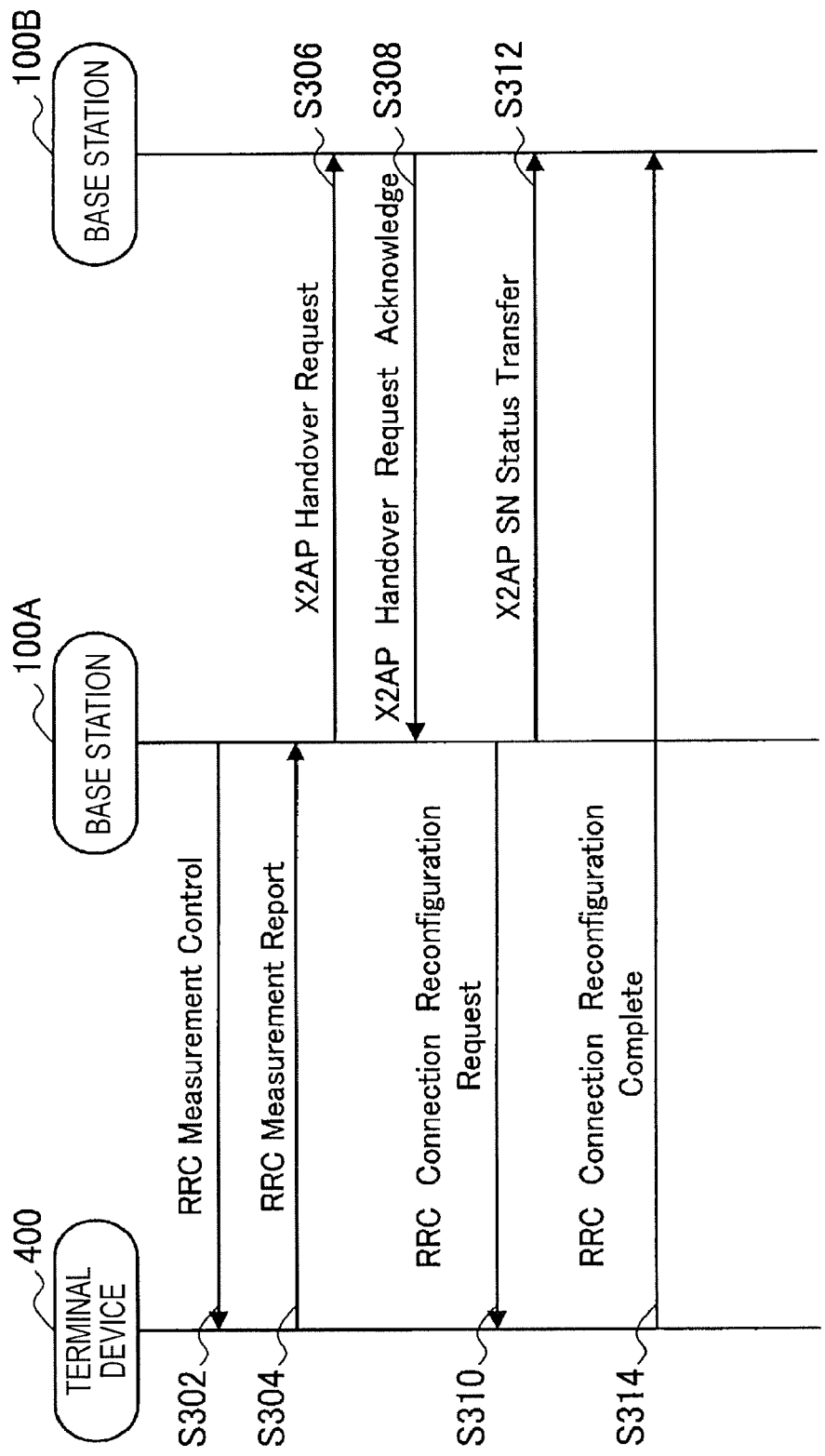
FIG. 12 is a sequence diagram illustrating an example of a flow of exchange processing of correspondence information executed in the system according to this embodiment.

FIG. 12 is a sequence diagram illustrating an example of a flow of the exchange processing of correspondence information executed in the system 1 according to the present embodiment. As illustrated in FIG. 12, the terminal device 400, the base station 100A, and the base station 100B are involved in this sequence.

First, the base station 100A transmits an RRC Measurement Control message to the terminal device 400 (Step S302). Then, the terminal device 400 transmits an RRC Measurement Report message storing a measurement result to the base station 100A (Step S304). With this procedure, the base station 100A receives a report of radio wave statuses between the terminal device 400 and other base stations therearound. At this time, in a case where another base station (for example, the base station 100B) having a more favorable radio wave status is reported, the following handover procedure is started.

The base station 100A requests handover by transmitting an X2AP Handover Request message to the base station 100B (Step S306). In a case where handover is acceptable, the base station 100B transmits an X2AP Handover Request Acknowledge message to the base station 100A (Step S308).

Next, the base station 100A performs instruction on handover to the base station 100B by transmitting an RRC Connection Reconfiguration Request message to the terminal device 400 (Step S310).

Then, the base station 100A transfers information on the terminal device 400 by transmitting an X2AP SN Status Transfer message to the base station 100B (Step S312). The base station 100A transmits correspondence information to the base station 100B at the same time as transfer or separately therefrom. More accurately, correspondence information is transmitted from the control device 300A corresponding to the base station 100A to the control device 300B corresponding to the base station 100B.

Then, the terminal device 400 transmits an RRC Connection Reconfiguration Complete message to the base station 100B Thus, the procedure for handover is terminated (Step S314).

Thus, the processing is terminated.

(3-2) Second Example

A second example is an example in which correspondence information is exchanged between the control device 300 and the NAT device 40. Hereinafter, description will be provided with reference to FIG. 13. For example, in a case where handover is performed between the base station 100 in which the control device 300 is provided and a base station in which the control device 300 is not provided, exchange of correspondence information according to the present example is performed.

Figure 13:
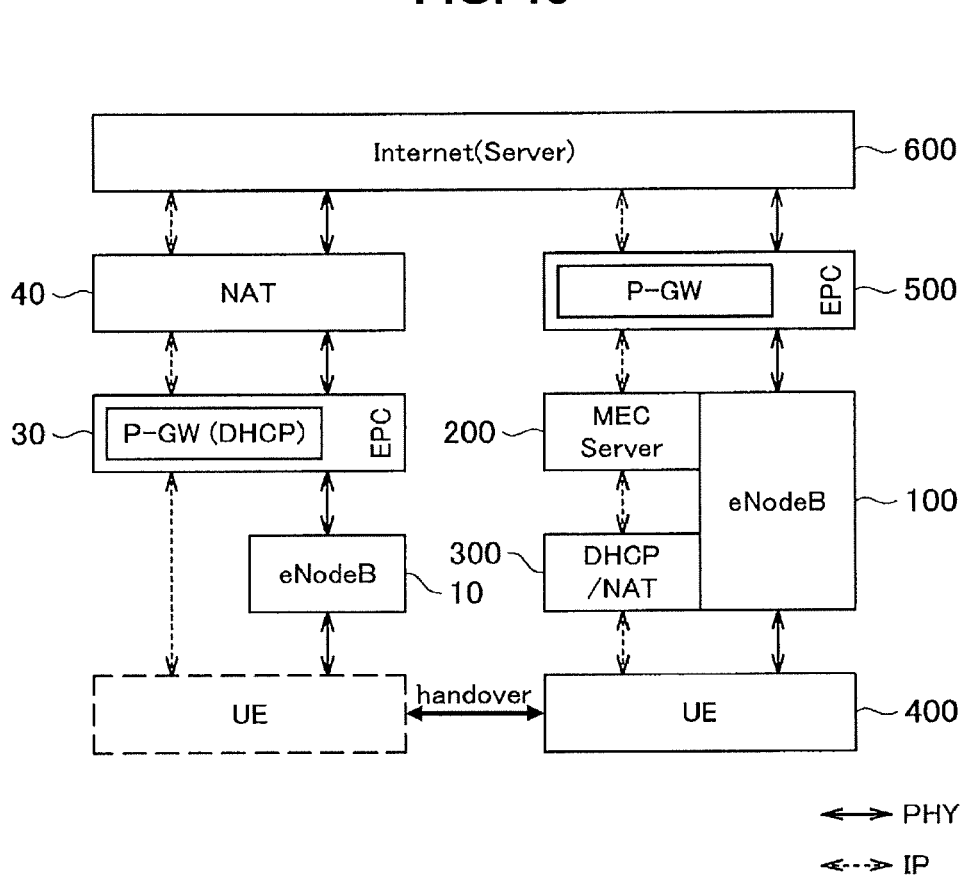
FIG. 13 is an explanatory view for describing exchange processing of correspondence information in the system according to this embodiment.

FIG. 13 is an explanatory view for describing exchange processing of correspondence information in the system 1 according to the present embodiment. In the example illustrated in FIG. 13, in the system 1, the base station (eNodeB) 100 in which the control device (DHCP/NAT) 300 is provided coexists with the base station (eNodeB) 10 in which the control device 300 is not provided. A solid-line arrow in FIG. 13 shows a physical connection, and a dashed-line arrow therein shows a logical connection, more specifically, an IP connection.

For example, handover is assumed to be performed from the base station in which the control device 300 is provided to the base station in which the control device 300 is not provided. In that case, a NAT device that manages the base station serving as a handover destination as a target is notified of correspondence information. That is, in the example illustrated in FIG. 13, regarding handover from the base station 100 to the base station 10, the control device 300 notifies the NAT device 40 of correspondence information. With such notification processing, also regarding handover from a base station to which the present technology is applied to a base station to which the present technology is not applied, correspondence information is taken over by a handover destination, and conversion/relay processing is appropriately performed.

Meanwhile, handover is assumed to be performed from the base station in which the control device 300 is not provided to the base station in which the control device 300 is provided. In that case, correspondence information is acquired from the NAT device that manages the base station serving as a handover source as a target. That is, in the example illustrated in FIG. 13, regarding handover from the base station 10 to the base station 100, the control device 300 acquires correspondence information from the NAT device 40. With such acquisition processing, also regarding handover from a base station to which the present technology is not applied to a base station to which the present technology is applied, correspondence information is taken over by a handover destination, and conversion/relay processing is appropriately performed.

(4) Function ON/OFF

A device having the NAT function or DHCP function (for example, the P-GW 30, the NAT device 40, or the control device 300) may stop a part or all of the function depending on a circumstance. For example, the control device 300 (for example, the conversion processing unit 335) may stop the NAT function (conversion processing of internal IP address and external IP address).

For example, there is assumed a case where the base station 100 in which the control device 300 is provided is disposed in a device having the DHCP function and the NAT function (for example, P-GW). In such a case, the P-GW may stop the DHCP function and the NAT function. It is because the DCHP function and the NAT function are exerted in the control device 300. For example, in a case where the P-GW receives an IPv4 global IP address from the terminal device 400, the P-GW stops the DHCP function and the NAT function and passes the IP address therethrough. With this processing, consistency of the IP address is maintained.

The same applies to a configuration in which a small cell base station in which the control device 300 is provided is disposed in a macro cell base station in which the control device 300 is provided.

As another example, there is assumed a case where an IPv6 IP address is used in equipment on the Internet side. In such a case, a device having the NAT function or DHCP function may stop the NAT function. For example, in a case where the control device 300 communicates with a server or the like on the Internet, the control device 300 exerts the NAT function regarding an IPv4 IP address to thereby perform NAT and stops the NAT function regarding the IPv6 IP address. In a case where IPv6 IP addresses are used in all equipment on the Internet side in the future, the control device 300 removes the NAT function and continuously exerts the DHCP function.

4. APPLICATION EXAMPLES

The technology of the present disclosure can be applied to various products. For example, the control device 300 may be realized as a server of any type such as a tower server, a rack server, a blade server, or the like. In addition, at least a part of constituent elements of the control device 300 may be realized in a module mounted in a server (e.g., an integrated circuit module configured in one die or a card or a blade inserted into a slot of a blade server).

Further, the base station 100 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the base station 100 may be realized as another type of base station such as a node B or a base transceiver station (BTS). The base station 100 may include a main body that controls wireless communication (also referred to as a base station device) and one or more remote radio heads (RRHs) disposed in a different place from the main body. In addition, various types of terminals to be described below may operate as the base station 100 by temporarily or semi-permanently executing the base station function. Further, at least a part of constituent elements of the base station 100 may be realized in the base station device or a module for the base station device.

In addition, the terminal device 400 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal device 400 may be realized as a terminal that performs machine-to-machine (M2M) communication (also referred to as a machine type communication (MTC) terminal). Furthermore, at least a part of the constituent elements of the terminal device 400 may be realized in a module mounted in such a terminal (for example, an integrated circuit module configured in one die).

4.1. Application Example with Regard to Control Entity

Figure 14:
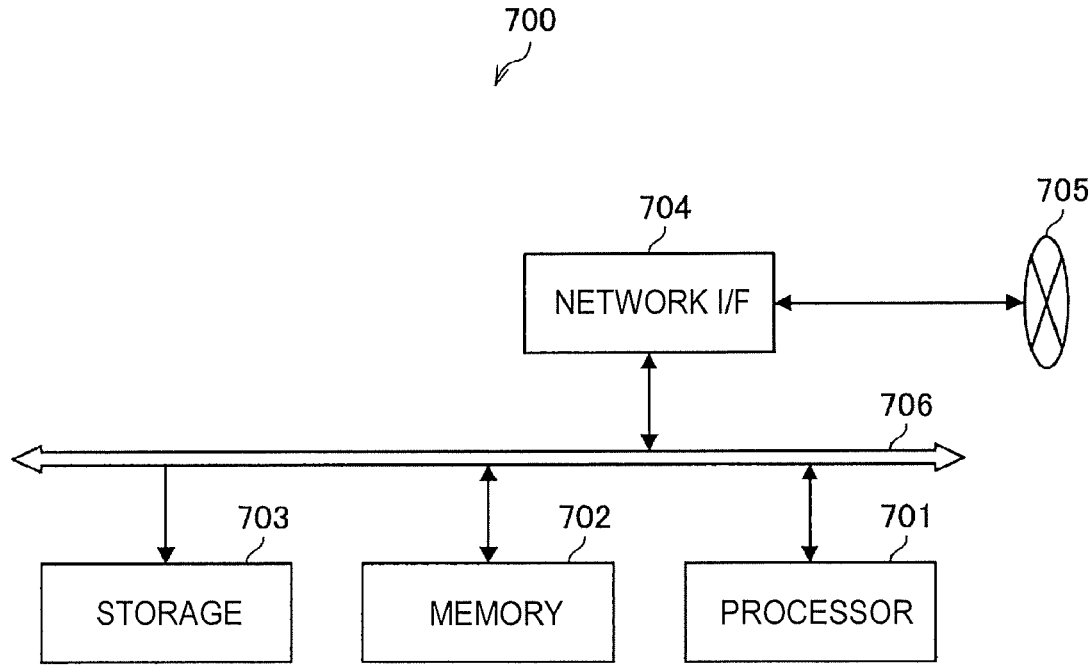
FIG. 14 is a block diagram illustrating an example of a schematic configuration of a server.

FIG. 14 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP) and controls various functions of the server 700. The memory 702 includes a random access memory (RAM) and a read only memory (ROM) and stores programs executed by the processor 701 and data. The storage 703 can include a storage medium such as a semiconductor memory or a hard disk.

The network interface 704 is a wired communication interface for connecting the server 700 to a wired communication network 705. The wired communication network 705 may be a core network such as an evolved packet core (EPC) or a packet data network (PDN) such as the Internet.

The bus 706 connects the processor 701, the memory 702, the storage 703, and the network interface 704 to each other. The bus 706 may include two or more buses that operate at different speeds (e.g., a high-speed bus and a low-speed bus).

In the server 700 illustrated in FIG. 14, one or more constituent elements included in the control device 300 described with reference to FIG. 7 (the relay processing unit 331, the assigning unit 333, the conversion processing unit 335, and/or the information exchange unit 337) may be implemented by the processor 701. As an example, a program for causing a processor to function as the one or more constituent elements (i.e., a program for causing a processor to execute operations of the one or more constituent elements) may be installed in the server 700 and the processor 701 may execute the program. As another example, a module including the processor 701 and the memory 702 may be mounted in the server 700 and the one or more constituent elements may be implemented by the module. In this case, the module may store a program for causing a processor to function as the one or more constituent elements in the memory 702 and the program may be executed by the processor 701. The server 700 or the module may be provided as devices having the above-described one or more constituent elements as described above, or the program for causing a processor to function as the one or more constituent elements may be provided. In addition, a readable recording medium in which the program is recorded may be provided.

In addition, in the smartphone 700 shown in FIG. 14, the communication unit 310 described with reference to FIG. 7 may be implemented by the network OF 704. Moreover, the storage unit 320 may be implemented by the memory 702 or the storage 703.

4.2. Application Example with Regard to Base Station

First Application Example

Figure 15:
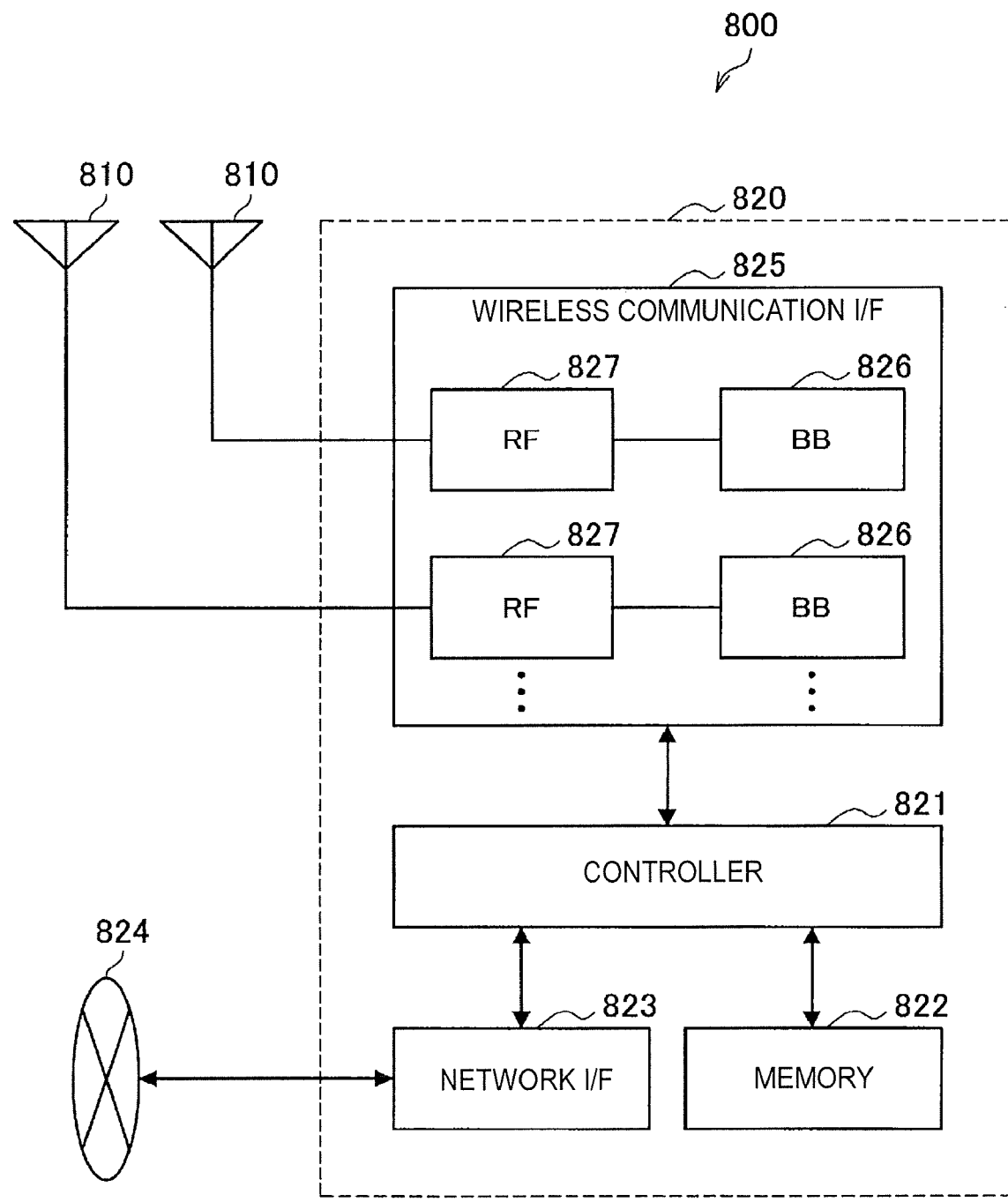
FIG. 15 is a block diagram illustrating a first example of a schematic configuration of an eNB.

FIG. 15 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 15. For example, the multiple antennas 810 may be compatible with multiple frequency bands used by the eNB 800. Although FIG. 15 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RANI and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In this case, the eNB 800 may be connected to a core network node or another eNB through a logical interface (e.g. S1 interface or X2 interface). The network interface 823 may also be a wired communication interface or a wireless communication interface for wireless backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 15. For example, the multiple BB processors 826 may be compatible with multiple frequency bands used by the eNB 800. The wireless communication interface 825 may include the multiple RF circuits 827, as illustrated in FIG. 15. For example, the multiple RF circuits 827 may be compatible with multiple antenna elements. Although FIG. 15 illustrates the example in which the wireless communication interface 825 includes the multiple BB processors 826 and the multiple RF circuits 827, the wireless communication interface 825 may also include a single BB processor 826 or a single RF circuit 827.

In the eNB 800 shown in FIG. 15, one or more constituent elements included in the base station 100 (the processing unit 150) described with reference to FIG. 6 may be implemented by the wireless communication interface 825. Further, one or more constituent elements included in the control device 300 (the relay processing unit 331, the assigning unit 333, the conversion processing unit 335, and/or the information exchange unit 337) described with reference to FIG. 7 may also be implemented by the wireless communication interface 825. Alternatively, at least some of these constituent elements may be implemented by the controller 821. As an example, a module which includes a part (for example, the BB processor 826) or all of the wireless communication interface 825 and/or the controller 821 may be mounted in eNB 800, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the eNB 800, and the wireless communication interface 825 (for example, the BB processor 826) and/or the controller 821 may execute the program. As described above, the eNB 800, the base station device 820, or the module may be provided as a device which includes the one or more constituent elements, and the program for causing the processor to function as the one or more constituent elements may be provided. In addition, a readable recording medium in which the program is recorded may be provided.

In addition, in the eNB 800 shown in FIG. 15, the wireless communication unit 120 described with reference to FIG. 6 may be implemented by the wireless communication interface 825 (for example, the RF circuit 827). Moreover, the antenna unit 110 may be implemented by the antenna 810. In addition, the network communication unit 130 may be implemented by the controller 821 and/or the network interface 823. In addition, the storage unit 140 may be implemented by the memory 822.

Second Application Example

Figure 16:
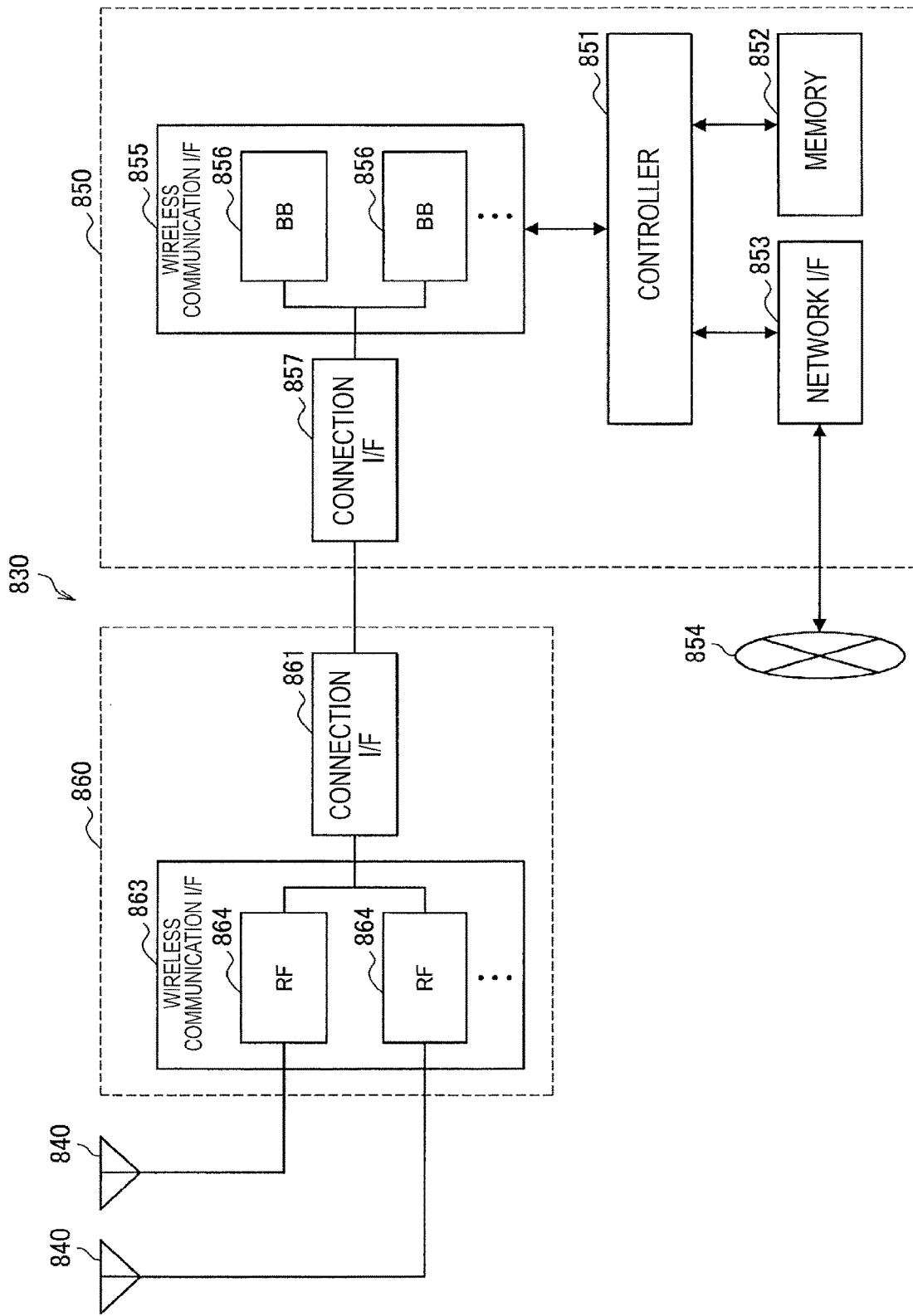
FIG. 16 is a block diagram illustrating a second example of the schematic configuration of the eNB.

FIG. 16 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 16. For example, the multiple antennas 840 may be compatible with multiple frequency bands used by the eNB 830. Although FIG. 16 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 15.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 15, except the BB processor 856 is connected to the RF circuit 864 of the RRH 860 via the connection interface 857. The wireless communication interface 855 may include the multiple BB processors 856, as illustrated in FIG. 16. For example, the multiple BB processors 856 may be compatible with multiple frequency bands used by the eNB 830. Although FIG. 16 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 16. For example, the multiple RF circuits 864 may support multiple antenna elements. Although FIG. 16 illustrates the example in which the wireless communication interface 863 includes the multiple RF circuits 864, the wireless communication interface 863 may also include a single RF circuit 864.

In the eNB 830 shown in FIG. 16, one or more constituent elements included in the base station 100 (the processing unit 150) described with reference to FIG. 6 may be implemented by the wireless communication interface 855 and/or the wireless communication interface 863. Further, one or more constituent elements included in the control device 300 (the relay processing unit 331, the assigning unit 333, the conversion processing unit 335, and/or the information exchange unit 337) described with reference to FIG. 7 may also be implemented by the wireless communication interface 855 and/or the wireless communication interface 863. Alternatively, at least some of these constituent elements may be implemented by the controller 851. As an example, a module which includes a part (for example, the BB processor 856) or all of the wireless communication interface 855 and/or the controller 851 may be mounted in eNB 830, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the eNB 830, and the wireless communication interface 855 (for example, the BB processor 856) and/or the controller 851 may execute the program. As described above, the eNB 830, the base station device 850, or the module may be provided as a device which includes the one or more constituent elements, and the program for causing the processor to function as the one or more constituent elements may be provided. In addition, a readable recording medium in which the program is recorded may be provided.

In addition, in the eNB 830 shown in FIG. 16, the wireless communication unit 120 described, for example, with reference to FIG. 6 may be implemented by the wireless communication interface 863 (for example, the RF circuit 864). Moreover, the antenna unit 110 may be implemented by the antenna 840. In addition, the network communication unit 130 may be implemented by the controller 851 and/or the network interface 853. In addition, the storage unit 140 may be implemented by the memory 852.

4.3. Application Example with Regard to Terminal Device

First Application Example

Figure 17:
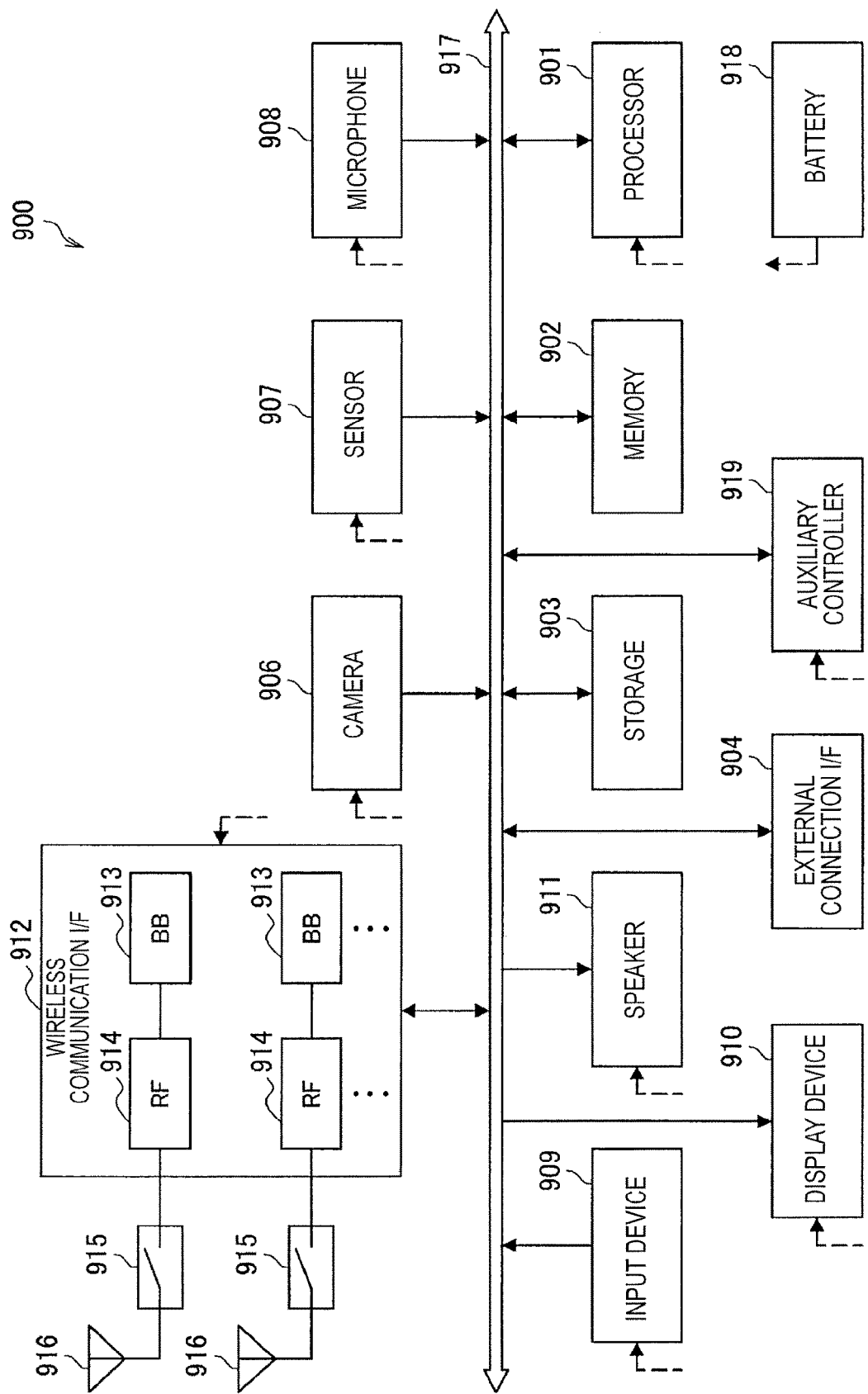
FIG. 17 is a block diagram illustrating an example of a schematic configuration of a smartphone.

FIG. 17 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 913 and the multiple RF circuits 914, as illustrated in FIG. 17.

Although FIG. 17 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 17. Although FIG. 17 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 17 via feeder lines, which are partially shown as dashed lines in the figure. The auxiliary controller 919 operates a minimum necessary function of the smartphone 900, for example, in a sleep mode.

In the smartphone 900 shown in FIG. 17, one or more constituent elements included in the terminal device 400 (the processing unit 440) described with reference to FIG. 8 may be implemented by the wireless communication interface 912. Alternatively, at least some of these constituent elements may be implemented by the processor 901 or the auxiliary controller 919. As an example, a module which includes a part (for example, the BB processor 913) or all of the wireless communication interface 912, the processor 901 and/or the auxiliary controller 919 may be mounted in the smartphone 900, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the smartphone 900, and the wireless communication interface 912 (for example, the BB processor 913), the processor 901 and/or the auxiliary controller 919 may execute the program. As described above, the smartphone 900 or the module may be provided as a device which includes the one or more constituent elements, and the program for causing the processor to function as the one or more constituent elements may be provided. In addition, a readable recording medium in which the program is recorded may be provided.

In addition, in the smartphone 900 shown in FIG. 17, the wireless communication unit 420 described, for example, with reference to FIG. 8 may be implemented by the wireless communication interface 912 (for example, the RF circuit 914). Moreover, the antenna unit 410 may be implemented by the antenna 916. In addition, the storage unit 430 may be implemented by the memory 902.

Second Application Example

Figure 18:
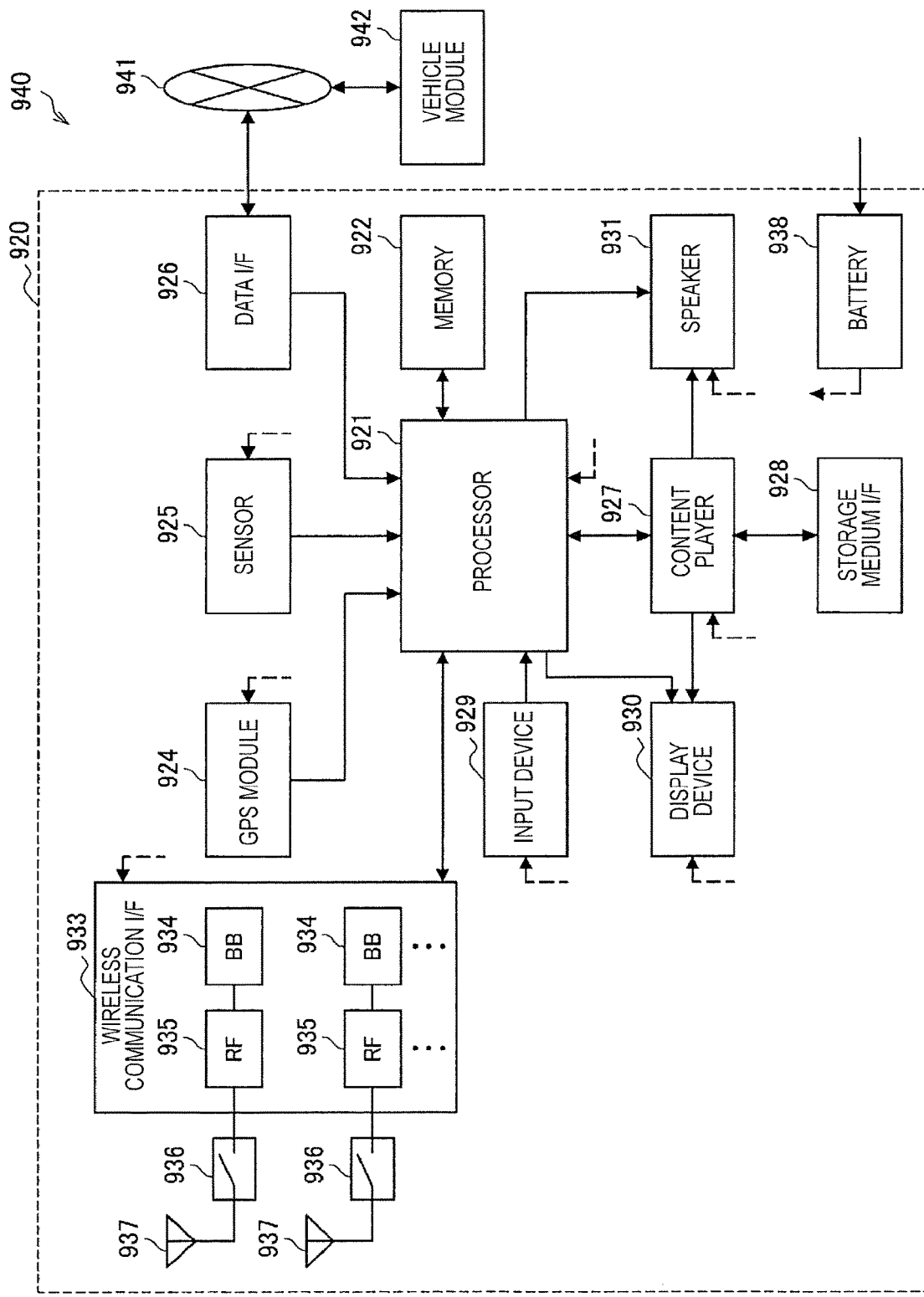
FIG. 18 is a block diagram illustrating an example of a schematic configuration of a car navigation device.

FIG. 18 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 18. Although FIG. 18 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 18. Although FIG. 18 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 18 via feeder lines that are partially shown as dashed lines in the figure. The battery 938 accumulates power supplied form the vehicle.

In the car navigation device 920 shown in FIG. 18, one or more constituent elements included in the terminal device 400 (the processing unit 440) described with reference to FIG. 8 may be implemented by the wireless communication interface 933. Alternatively, at least some of these constituent elements may be implemented by the processor 921. As an example, a module which includes a part (for example, the BB processor 934) or all of the wireless communication interface 933 and/or the processor 921 may be mounted in the car navigation device 920, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the car navigation device 920, and the wireless communication interface 933 (for example, the BB processor 934) and/or the processor 921 may execute the program. As described above, the car navigation device 920 or the module may be provided as a device which includes the one or more constituent elements, and the program for causing the processor to function as the one or more constituent elements may be provided. In addition, a readable recording medium in which the program is recorded may be provided.

In addition, in the car navigation device 920 shown in FIG. 18, the wireless communication unit 420 described with reference to FIG. 8, for example, may be implemented by the wireless communication interface 933 (for example, the RF circuit 935). Moreover, the antenna unit 410 may be implemented by the antenna 937. In addition, the storage unit 430 may be implemented by the memory 922.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the processing unit 440. The vehicle module 942 generates vehicle data such as vehicle speed, engine speed, and trouble information, and outputs the generated data to the in-vehicle network 941.

5. CONCLUSION

Hereinabove, an embodiment of the present disclosure has been described in detail with reference to FIGS. 1 to 18. As described above, a control device relays communication between a terminal device and a service provider device by converting an internal IP address assigned to the terminal device and an external IP address, communicating with the terminal device by using the internal IP address, and communicating with the service provider device by using the external IP address. With this, a server on the Internet and a MEC server can use the same IP address regarding identification of the terminal device. Therefore, for example, it is possible to smoothly take over a service between the MEC server and the server on the Internet.

Further, the control device is typically provided in a base station. Therefore, communication for assigning an IP address and taking over correspondence information due to handover is completed between the terminal device and the base station (communication with EPC is not performed). Therefore, it is possible to minimize occurrence of traffic.

Further, the control device assigns an IPv6 IP address as an internal IP address. Therefore, the control device can assign an IP address that is internationally unique. Thus, even in a case where the number of terminal devices is explosively increased in the future, it is possible to operate IP addresses that do not collide with one another even in a case where handover is performed.

Further, the control device may stop conversion processing of an internal IP address and an external IP address. With this, in a case where an IPv6 IP address is used in all equipment on the Internet in the future, it is possible to remove the NAT function and use an IPv6 IP address in all communication, and therefore operation thereof is smoothly switched.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiment, an IPv6 IP address is used as an example of an internal IP address assigned by the control device 300. However, the present technology is not limited to such an example. The IP address assigned by the control device 300 may be an IP address conforming to another arbitrary protocol and may be, for example, an IPv4 local (private) IP address and a port number.

Further, in the above embodiment, an example in which the MEC server 200 and the control device 300 are provided in the base station 100 has been described. However, the present technology is not limited to such an example. For example, the control device 300 may be provided in the base station 100 in which the MEC server 200 is not provided.

Specifically, for example, the control device 300 may be provided in a small cell base station, and the MEC server 200 may be provided in a macro cell base station including the small cell base station. The control device 300 only needs to be disposed between the terminal device 400 and the MEC server 200.

Note that it is not necessary for the processes described in this specification with reference to the flowchart and the sequence diagram to be executed in the order shown in the flowchart. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An apparatus including:
a relay processing unit configured to perform relay processing of communication performed between a service provider device that provides a service to a terminal device and is provided in a radio access network and the terminal device; and
a conversion processing unit configured to perform processing for converting an internal IP address assigned to the terminal device and an external IP address, in which
in the relay processing, the relay processing unit communicates with the terminal device with use of the internal IP address and communicates with the service provider device with use of the external IP address.

(2)
The apparatus according to (1), further including:
an information exchange unit configured to exchange information indicating correspondence between the internal IP address and the external IP address with an information processing apparatus relating to handover of the terminal device.

(3)
The apparatus according to (2), in which
in a case where the terminal device is handed over from a base station corresponding to the apparatus to another base station, the information exchange unit notifies a handover destination of the information indicating the correspondence.

(4)
The apparatus according to (3), in which
the other apparatus corresponding to a base station serving as the handover destination is notified of the information indicating the correspondence.

(5)
The apparatus according to (3), in which
a network address translation (NAT) device that manages a base station serving as the handover destination as a target is notified of the information indicating the correspondence.

(6)
The apparatus according to any one of (2) to (5), in which
in a case where the terminal device is handed over from another base station to a corresponding base station, the information exchange unit acquires the information indicating the correspondence from a handover source.

(7)
The apparatus according to (6), in which
the information indicating the correspondence is acquired from the other apparatus corresponding to a base station serving as the handover source.

(8)
The apparatus according to (6), in which
the information indicating the correspondence is acquired from a NAT device that manages a base station serving as the handover source as a target.

(9)
The apparatus according to any one of (2) to (8), in which
the apparatus is provided in a base station.

(10)
The apparatus according to (9), in which
the information exchange unit exchanges the information indicating the correspondence with another base station.

(11)
The apparatus according to (9), in which
the information exchange unit exchanges the information indicating the correspondence with another base station via the terminal device.

(12)
The apparatus according to any one of (1) to (11), further including:
an assigning unit configured to assign the internal IP address to the terminal device.

(13)
The apparatus according to (12), in which
the assigning unit assigns an IPv6 IP address as assignment of the internal IP address.

(14)
The apparatus according to (13), in which
the conversion processing unit stops the processing for converting the internal IP address and the external IP address.

(15)
An apparatus including:
a processing unit configured to communicate, by using an assigned internal IP address, with a relay device that performs relay processing of communication performed with a service provider device provided in a radio access network, in which
a service provided by the service provider device with use of an external IP address is relayed after the external IP address and the internal IP address are converted in the relay device.

(16)
A method including:
performing relay processing of communication performed between a service provider device that provides a service to a terminal device and is provided in a radio access network and the terminal device;
performing processing for causing a processor to convert an internal IP address assigned to the terminal device and an external IP address; and
in the relay processing, communicating with the terminal device with use of the internal IP address and communicating with the service provider device with use of the external IP address.

(17)
A method including:
causing a processor to communicate, by using an assigned internal IP address, with a relay device that performs relay processing of communication performed with a service provider device provided in a radio access network, in which a service provided by the service provider device with use of an external IP address is relayed after the external IP address and the internal IP address are converted in the relay device.

REFERENCE SIGNS LIST 1 system
100 base station
110 antenna unit
120 wireless communication unit
130 network communication unit
140 storage unit
150 processing unit
200 MEC server
300 control device
310 communication unit
320 storage unit
330 processing unit
331 relay processing unit
333 assigning unit
335 conversion processing unit
337 information exchange unit
400 terminal device
410 antenna unit
420 wireless communication unit
430 storage unit
440 processing unit
500 EPC
600 server

The invention claimed is:

1. An apparatus comprising:
circuitry; and
a memory storing instructions that, when executed by the circuitry, control the circuitry to
perform relay processing of communication performed between a service provider device that provides a service to a terminal device and is provided in a radio access network and the terminal device;
perform further relay processing of communication performed between a second service provider device that provides a second service to the terminal device and the terminal device; and
perform processing for converting an internal IP address assigned to the terminal device and an external IP address, wherein
in the relay processing, the circuitry communicates with the terminal device with use of the internal IP address and communicates with the service provider device and the second service provider device with use of the external IP address,
the circuitry is configured to use the external IP address to allow a takeover of service between the service provider device and the second service provider device without interruption of a continuity of service;
the apparatus and the service provider device are located in a base station of the ratio access network; and
the second service provider device is located remotely from the base station.

2. The apparatus according to claim 1, further comprising:
an information exchange unit configured to exchange information indicating correspondence between the internal IP address and the external IP address with an information processing apparatus relating to handover of the terminal device.

3. The apparatus according to claim 2, wherein
in a case where the terminal device performs the handover from another base station to a corresponding base station, the information exchange unit acquires the information indicating the correspondence from a handover source.

4. The apparatus according to claim 3, wherein
the information indicating the correspondence is acquired from another apparatus corresponding to a base station serving as the handover source.

5. The apparatus according to claim 3, wherein
the circuitry is configured to acquire the information indicating the correspondence from a NAT device that manages a base station serving as the handover source as a target.

6. The apparatus according to claim 2, wherein
in a case where the terminal device performs the handover from the base station to another base station, the information exchange unit notifies a handover destination of the information indicating the correspondence.

7. The apparatus according to claim 6, wherein
another apparatus corresponding to a base station serving as the handover destination is notified of the information indicating the correspondence.

8. The apparatus according to claim 6, wherein
the circuitry is configured to notify a network address translation (NAT) device that manages a base station serving as the handover destination as a target of the information indicating the correspondence.

9. The apparatus according to claim 1, wherein
the information exchange unit exchanges the information indicating the correspondence with another base station.

10. The apparatus according to claim 1, wherein
the information exchange unit exchanges the information indicating the correspondence with another base station via the terminal device.

11. The apparatus according to claim 1, further comprising:
an assigning unit configured to assign the internal IP address to the terminal device.

12. The apparatus according to claim 11, wherein
the assigning unit assigns an IPv6 IP address as assignment of the internal IP address.

13. The apparatus according to claim 12, wherein
the conversion processing unit stops processing for converting the internal IP address and the external IP address.

14. An apparatus comprising:
circuitry; and
a memory storing instructions that, when executed by the circuitry, control the circuitry to communicate, by using an assigned internal IP address, with a relay device that performs relay processing of communication performed with a service provider device provided in a base station of a radio access network and that performs further relay processing of communication performed with a second service provider device provided remotely from the base station, wherein
a service provided by the service provider device with use of an external IP address and a second service provided by the second service provider device are relayed after the external IP address and the internal IP address are converted in the relay device; and
the circuitry is configured to use the external IP address to allow a takeover of service between the service provider device and the second service provider device without interruption of a continuity of service.

15. A method comprising:
performing relay processing of communication performed between a service provider device that provides a service to a terminal device and is provided in a radio access network and the terminal device;
performing further relay processing of communication performed between a second service provider device that provides a second service to the terminal device and the terminal device;
performing processing for causing a processor to convert an internal IP address assigned to the terminal device and an external IP address; and
in the relay processing, communicating with the terminal device with use of the internal IP address and communicating with the service provider device with use of the external IP address, wherein
the external IP address is used to allow a takeover of service between the service provider device and the second service provider device without interruption of a continuity of service;
the apparatus and the service provider device are located in a base station of the ratio access network; and
the second service provider device is located remotely from the base station.

* * * * *